(12) United States Patent
Monceaux et al.

(10) Patent No.: US 9,950,421 B2
(45) Date of Patent: Apr. 24, 2018

(54) HUMANOID GAME-PLAYING ROBOT, METHOD AND SYSTEM FOR USING SAID ROBOT

(75) Inventors: Jerome Monceaux, Paris (FR); Celine Boudier, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 13/808,040

(22) PCT Filed: Jun. 27, 2011

(86) PCT No.: PCT/EP2011/060693
§ 371 (c)(1),
(2), (4) Date: Jan. 2, 2013

(87) PCT Pub. No.: WO2012/000927
PCT Pub. Date: Jan. 5, 2012

(65) Prior Publication Data
US 2013/0103196 A1    Apr. 25, 2013

(30) Foreign Application Priority Data
Jul. 2, 2010    (FR) ...................................... 10 55382

(51) Int. Cl.
*A63F 9/00* (2006.01)
*B25J 9/00* (2006.01)
(Continued)

(52) U.S. Cl.
CPC ............. *B25J 9/0006* (2013.01); *A63F 9/183* (2013.01); *A63H 11/18* (2013.01); *G06N 3/008* (2013.01);
(Continued)

(58) Field of Classification Search
USPC .................................................. 700/245–264
See application file for complete search history.

(56) References Cited

U.S. PATENT DOCUMENTS

| 4,398,720 A | * | 8/1983 | Jones ................. A63F 3/00643 |
| | | | 273/238 |
| 4,729,563 A | * | 3/1988 | Yokoi ..................... A63F 13/04 |
| | | | 446/175 |

(Continued)

FOREIGN PATENT DOCUMENTS

| JP | 2001179663 A | 7/2001 |
| JP | 2002307354 A | 10/2002 |

(Continued)

*Primary Examiner* — Jonathan L Sample
(74) *Attorney, Agent, or Firm* — Baker & Hostetler LLP

(57) ABSTRACT

The invention relates to a player humanoid robot, a method and computer programs associated therewith. The prior art does not disclose any humanoid robot able to move on its lower limbs, to perform gestures, to communicate visual and/or audible signs, to receive same and interpret them so as to deduce therefrom appropriate behaviors for participating in a game in time as compere, questioner, questioned, investigator or mobile stake for the game. The hardware architectures, internal software and software for programming the robot of the invention make it possible to carry out these functions and to create new game experiences in which the boundaries between virtual world and real world are shifted once again.

20 Claims, 13 Drawing Sheets

(51) Int. Cl.
  *A63F 9/18* (2006.01)
  *A63H 11/18* (2006.01)
  *G06N 3/00* (2006.01)
  *A63F 9/24* (2006.01)

(52) U.S. Cl.
  CPC . *A63F 2009/243* (2013.01); *A63F 2009/2433* (2013.01); *A63F 2009/2476* (2013.01); *A63H 2200/00* (2013.01)

(56) References Cited

U.S. PATENT DOCUMENTS

| | | | | |
|---|---|---|---|---|
| 4,815,733 | A * | 3/1989 | Yokoi | A63F 13/04 446/175 |
| 6,452,348 | B1 * | 9/2002 | Toyoda | B25J 13/003 318/3 |
| 6,519,506 | B2 * | 2/2003 | Osawa | A63H 3/28 318/565 |
| 6,560,512 | B1 * | 5/2003 | Rosen | B25J 9/1664 700/245 |
| 6,580,369 | B1 * | 6/2003 | Eberhardt | G06K 7/0008 257/E21.503 |
| 6,615,109 | B1 * | 9/2003 | Matsuoka | G06K 17/00 700/223 |
| 6,714,840 | B2 * | 3/2004 | Sakaue | B25J 9/1694 318/568.1 |
| 6,832,132 | B2 * | 12/2004 | Ishida | B62D 57/032 180/8.1 |
| 6,895,305 | B2 * | 5/2005 | Lathan | A63F 13/00 219/130.21 |
| 6,967,455 | B2 * | 11/2005 | Nakadai | B25J 13/00 318/567 |
| 6,980,956 | B1 * | 12/2005 | Takagi | G06N 3/004 700/250 |
| 7,065,490 | B1 * | 6/2006 | Asano | G10L 13/033 318/568.12 |
| 7,164,969 | B2 * | 1/2007 | Wang | B25J 5/007 318/568.12 |
| 7,313,524 | B1 * | 12/2007 | Minamino | 704/270 |
| 8,484,146 | B2 * | 7/2013 | Movellan | B25J 13/003 700/245 |
| 8,594,845 | B1 * | 11/2013 | Gharpure | G10L 15/22 700/253 |
| 8,676,581 | B2 * | 3/2014 | Flaks | G10L 17/00 348/143 |
| 8,812,171 | B2 * | 8/2014 | Filev | B60W 50/10 701/1 |
| 8,918,208 | B1 * | 12/2014 | Hickman | B25J 9/1697 700/1 |
| 8,942,849 | B2 * | 1/2015 | Maisonnier | B25J 11/0005 370/352 |
| 9,302,393 | B1 * | 4/2016 | Rosen | B25J 9/1694 |
| 2002/0061504 | A1 * | 5/2002 | Saijo | B25J 13/00 434/268 |
| 2002/0081937 | A1 * | 6/2002 | Yamada | A63H 3/48 446/175 |
| 2002/0120362 | A1 * | 8/2002 | Lathan | A63F 13/00 700/245 |
| 2003/0045203 | A1 * | 3/2003 | Sabe | G06N 3/008 446/356 |
| 2003/0220796 | A1 * | 11/2003 | Aoyama | G10L 15/22 704/275 |
| 2004/0006483 | A1 * | 1/2004 | Sasaki | G10L 15/22 704/277 |
| 2004/0039483 | A1 * | 2/2004 | Kemp | B62D 57/02 700/245 |
| 2004/0104702 | A1 * | 6/2004 | Nakadai | B25J 13/00 318/568.12 |
| 2004/0190754 | A1 * | 9/2004 | Sakagami | H04N 7/18 382/103 |
| 2005/0038647 | A1 * | 2/2005 | Baker | G10L 15/065 704/231 |
| 2005/0197739 | A1 * | 9/2005 | Noda | B25J 11/001 700/245 |
| 2005/0216121 | A1 * | 9/2005 | Sawada | G06N 3/008 700/245 |
| 2005/0240412 | A1 * | 10/2005 | Fujita | G10L 15/16 704/270 |
| 2006/0122837 | A1 * | 6/2006 | Kim | G10L 15/22 704/270.1 |
| 2006/0136210 | A1 * | 6/2006 | Menendez-Pidal | G10L 15/144 704/256.8 |
| 2006/0143017 | A1 * | 6/2006 | Sonoura | G10L 15/26 704/275 |
| 2006/0257830 | A1 * | 11/2006 | Lin | G09B 5/04 434/167 |
| 2006/0287850 | A1 * | 12/2006 | Morikawa | G10L 15/22 704/200 |
| 2007/0192910 | A1 * | 8/2007 | Vu | B25J 5/007 700/245 |
| 2008/0256008 | A1 * | 10/2008 | Kwok | G06N 3/004 706/20 |
| 2008/0281766 | A1 * | 11/2008 | Kwok | G06N 3/004 706/12 |
| 2009/0030552 | A1 * | 1/2009 | Nakadai | G06N 3/008 700/258 |
| 2009/0099849 | A1 * | 4/2009 | Iwasawa | G10L 15/22 704/275 |
| 2009/0162824 | A1 * | 6/2009 | Heck | G06N 3/004 434/322 |
| 2009/0187278 | A1 * | 7/2009 | Zhuk | G05D 1/0088 700/246 |
| 2009/0210227 | A1 * | 8/2009 | Sugiyama | G10L 15/22 704/246 |
| 2009/0252423 | A1 * | 10/2009 | Zhu | G06K 9/00201 382/209 |
| 2009/0313019 | A1 * | 12/2009 | Kato | G10L 17/26 704/254 |
| 2009/0319267 | A1 * | 12/2009 | Kurki-Suonio | G10L 15/30 704/235 |
| 2010/0185328 | A1 * | 7/2010 | Kim | B25J 9/104 700/259 |
| 2010/0250241 | A1 * | 9/2010 | Iwahashi | G10L 15/1822 704/10 |
| 2010/0329479 | A1 * | 12/2010 | Nakadai | B25J 9/00 381/92 |
| 2011/0224978 | A1 * | 9/2011 | Sawada | G06K 9/00221 704/231 |
| 2011/0231016 | A1 * | 9/2011 | Goulding | G06N 3/008 700/246 |

FOREIGN PATENT DOCUMENTS

| | | |
|---|---|---|
| JP | 2003340166 A | 12/2003 |
| JP | 2004198656 A | 7/2004 |
| JP | 2009011362 A | 1/2009 |
| KR | 10-2007-0061266 A | 6/2007 |
| WO | 99/67067 A1 | 12/1999 |
| WO | 00/44464 A1 | 8/2000 |
| WO | 01/12285 A1 | 2/2001 |
| WO | 01/70361 A2 | 9/2001 |
| WO | 2009/124951 A1 | 10/2009 |
| WO | 2009/124955 A1 | 10/2009 |
| WO | 2010/136427 A1 | 12/2010 |

\* cited by examiner

| MIMES | Child | Adult | Expert |
|---|---|---|---|
| Animals | Shark | Hen | Frog |
| | Elephant | Penguin | |
| | Rabbit | Gorilla | |
| | Bird | | |
| Sports | Boxing | Skiing | Shot put |
| | Tennis | Karate | Weightlifting |
| | Archery | Fencing | |
| Characters | Tarzan | Napoleon | Charlie Chaplin |
| | Superman | | Sherlock Holmes |
| Jobs | Guitarist | Lumberman | Orchestra Director |
| | Violinist | Pianist | Cameraman |
| | Singer | Painter | |

| CONUNDRUMS | Child | Adult | Expert |
|---|---|---|---|
| Calculations | Additions | Multiplications | Complex multiplications |
| | Subtractions | Divisions | Complex divisions |
| | | Complex additions | |
| | | Complex subtractions | |
| General knowledge | Multiple choice questions | Complex multiple choice questions | Complex normal questions |
| | Yes/No | Normal questions | |
| Observation | Movements of Nao | Complex movements of Nao | Movements of Nao with traps |
| | Colors of Nao | Complex colors of Nao | Colors of Nao with traps |

| SOUNDS | Child | Adult | Expert |
|---|---|---|---|
| Foreign languages | English | Italian | Russian |
| | German | Spanish | Creole |
| | Japanese | Arabic | |
| Nature | Dog | Storm | Peacock |
| | Horse | Donkey | Elephant |
| | Cat | Sea | |
| | Bird | | |
| | Monkey | | |
| | Cow | | |
| | Sheep | | |
| Daily life | Telephone | Typewriter | |
| | Train | Kettle | |
| | | Vacuum cleaner | |
| | | Horn | |
| Musical instruments | Piano | Bass | Harp |
| | Guitar | Trumpet | Clarinet |
| | Percussion | Harmonica | |
| | Flute | | |

FIG.5

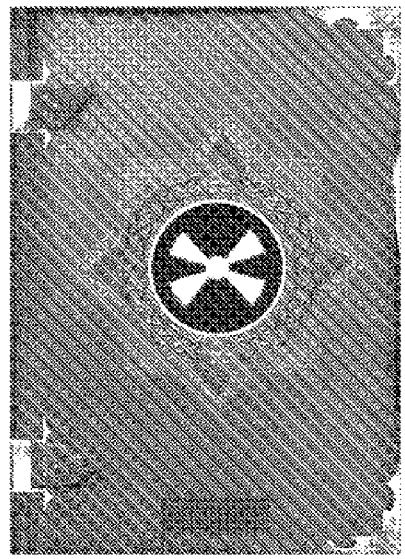
FIG.7b
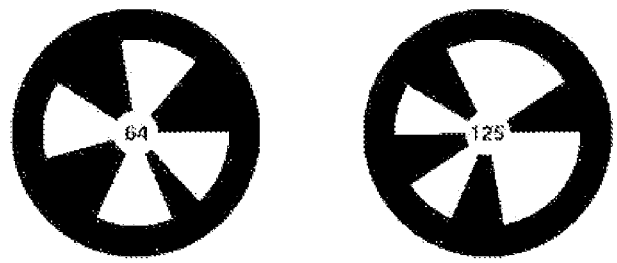
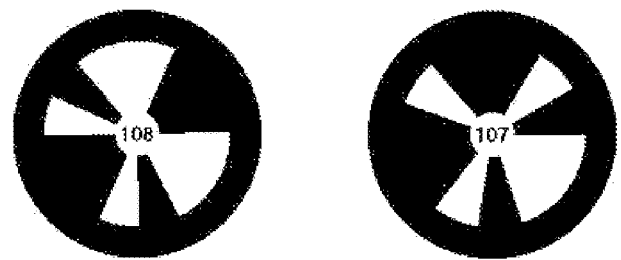
FIG.7c

HUMANOID GAME-PLAYING ROBOT, METHOD AND SYSTEM FOR USING SAID ROBOT

CROSS-REFERENCE TO RELATED APPLICATIONS

This application is a U.S. National Phase Application of PCT International Application PCT/EP2011/060693 filed Jun. 27, 2011 which claims priority to foreign French patent application No. FR 1055382, filed on Jul. 2, 2010, the disclosures of which are incorporated by reference in their entirety.

FIELD OF THE INVENTION

The present invention belongs to the field of humanoid robots. More precisely, it applies to the methods for programming and employing robots of this type for specialized uses, such as games.

BACKGROUND OF THE INVENTION

A robot may be described as humanoid as long as it possesses certain attributes of the appearance and functionalities of man: a head, a trunk, two arms, optionally two hands, two legs, two feet etc. Beyond appearance, the functions that a humanoid robot is capable of fulfilling will depend on its capacity to perform movements, to speak and to "reason". Humanoid robots are capable of walking, of making gestures, with the limbs or with the head. The complexity of the gestures that they are capable of performing is continually increasing. They can even play football, the Robocup having become the challenge where the world's best design teams of humanoid robots confront one another. Certain robots can speak, in response to speech heard and interpreted or by spouting a text which is dispatched to them by email or placed under their gaze. Computers, for the moment not embedded aboard humanoid robots, have been designed to play chess and have beaten the best grandmasters.

Virtual robots are moreover highly present in the video games universe, with a considerable development of avatars of real characters that live a "second life" in a mirror universe of the real universe ("Second Life"). But physical robots have hitherto hardly been mingled with the games universe. At the very most, a few simple implementations, such as the ROB (Robotic Operating Buddy) from Nintendo™ in the 1980s, may be mentioned. This robot is programmed to react to variations in brightness, color or shape of parts of a screen and to have behaviors determined as a function of sequences of a game that are displayed on the screen. These methods have formed the subject of several patents, notably American patents U.S. Pat. No. 4,729,563 and U.S. Pat. No. 4,815,733. The ROB is however not mobile on legs, thereby significantly limiting its capacity to participate in diversified games. Neither does it have any capacity for communication by speech. The humanoid robot from the company Sony™, which has formed the subject of patents U.S. Pat. Nos. 6,580,369 and 6,832,132, is described in game environments, notably football or athletic games. This is however its only recreational activity and it does not have any function allowing it to participate in complex games of a virtual universe, such as games of strategy. Non-humanoid automatons for carrying out specialized game functions (chess, certain card games, Guitar Hero, etc.) are also known. It would be advantageous to be able to have a humanoid robot capable of carrying out the entirety of these functions.

However, the problem posed by this integration on one and the same humanoid robot platform of the capacities to participate at one and the same time in games requiring a physical capacity, a capacity for expression and a capacity for reflection has not been solved by the solutions of the prior art.

The present invention solves this problem by affording a humanoid robot which can, for a plurality of games, serve as interface for a player in order to dialog with a game, provide him with an intelligent aid to progress through the game and occupy a completely separate place as player in a multi-player game.

SUMMARY OF THE INVENTION

For this purpose, the present invention discloses a humanoid robot capable of moving on its lower limbs, of performing movements of its upper limbs, of sending and receiving messages selected from a group of visual, audible, gestural and/or tactile messages and of producing at least one autonomous behavior, said at least one behavior constituting an element of a game sequence generated in response to at least one message selected from the group of visual, audible, gestural and/or tactile messages, said robot being configured to ask at least one question in the form of a message selected from the group of visual, audible, gestural and/or tactile messages and to determine whether at least one response message belonging to the same group contains a correct response, a false response or an ambiguous response.

Advantageously, said determination is performed on output from a loop of iterations determined as a function of recognition thresholds for said answers.

Advantageously, the robot of the invention is able to recognize objects in its environment and to integrate them into the sequence of said game.

Advantageously, the robot of the invention is the compere of a game of questions-answers in which at least one other player participates, who must provide the answers to the questions asked by the robot.

Advantageously, the robot of the invention is one of the players in a game in which at least one other player participates and in which it must recognize a person or a thing as a function at least of clues which are communicated to it by said at least one other player.

Advantageously, the robot of the invention is a player in a game in which it is able to cooperate with at least one other player to solve at least one riddle.

Advantageously, the movements of the robot of the invention are determined in part as a function of first displacement directives which are communicated to it by a remote control manipulated by a first player, of second displacement directives, antagonistic to the first directives, which are communicated to it visually by a second player and of third displacement directives, antagonistic to the second directives and which are communicated to it by a third player.

Advantageously, at least two robots participate in one and the same game, said at least two robots being in communication through at least one visual, audible and/or gestural message.

Advantageously, at least two robots participate in one and the same game, said at least two robots being in communication by exchange of behavior messages.

Advantageously, said exchange of behavior messages is activated after a step of reciprocal identification of said robots by exchange of information characterizing them.

Advantageously, said at least two robots are furthermore able to download a signal for synchronizing their movements.

Advantageously, at least one player robot and another player are situated in two places not linked by a local network.

Advantageously, said at least one player robot and another player communicate by wide area network communication protocol and in that said player robot is endowed with autonomous processing means for the encoding of network accesses.

Advantageously, a player is able to communicate with the robot of the invention by way of a visual code.

Advantageously, the robot of the invention is able to carry out a function of assistance of at least one other player consisting in performing at least one action in the game in place of the player.

Advantageously, the robot of the invention is able to trigger and manage the interruptions and resumptions of a game sequence.

The invention also discloses a method of controlling a humanoid robot capable of moving on its lower limbs, of performing movements of its upper limbs, of sending and receiving messages selected from a group of visual, audible, gestural and/or tactile messages and of producing at least one autonomous behavior, said at least one behavior constituting an element of a game sequence generated in response to at least one message selected from the group of visual, audible and/or gestural messages, said method further comprising a step in which said robot asks at least one question in the form of a message selected from the group of visual, audible, gestural and/or tactile messages and determines whether at least one response message belonging to the same group contains a correct response, a false response or an ambiguous response The invention also discloses a computer program comprising program code instructions allowing the execution of the above method when the program is executed on a computer, said program being adapted for allowing a humanoid robot to move on its lower limbs, to perform movements of its upper limbs, to send and to receive messages selected from a group of visual, audible, gestural and/or tactile messages and to produce at least one autonomous behavior, said at least one behavior constituting an element of a game sequence generated in response to at least one message selected from the group of visual, audible and/or gestural messages, said program further comprising a module capable of generating a behavior in which said robot asks at least one question in the form of a message selected from the group of visual, audible, gestural and/or tactile messages and a module capable of determining whether at least one response message belonging to the same group contains a correct response, a false response or an ambiguous response.

A humanoid robot such as that which is the subject of the present invention offers the players a completely new experience by placing at their disposal a physical avatar of a virtual character which can thus "exit" the virtual world so as to join the real world.

Having regard to the great versatility of the tools for developing games programs placed at the disposal of creators it is fully possible to envisage the development of an entirely new universe of games whose users will be able to source the applications in specialized virtual shops or have them exchanged, if a noncommercial model is chosen.

The humanoid robot of the invention also presents complementary advantages. It can replace, unprepared, a player who has to suspend his participation in a game. It can also be designed to periodically save the game configuration, thereby making it possible to add an additional saving means, in the case of a hardware or software problem on one or more game stations or servers. It may be endowed with sophisticated functions for parental control allowing it to adapt the periods and the modalities of a game to the age or to the profile of the players and to provide in real time and in natural language the players concerned with the explanations corresponding to the programmed control criteria.

Having regard to its communication capacities, the humanoid robot of the invention can easily receive updates of its programs and/or of its data which allow it to participate in new games or in new versions of the same games.

Several humanoid robots can also participate in one and the same game in identical roles (all players, all helpers, all interfaces) or in different roles.

Finally, the game functions of the humanoid robot of the invention are merely some of the complex functions that such a robot can accomplish. Such a robot can indeed ensure a mission of assisting and monitoring a person (child, elderly person, someone who is ill etc.) with whom it is placed, by giving if appropriate an alert in case of detecting a fall or impairment of a function programmed in order to be monitored.

BRIEF DESCRIPTION OF THE DRAWINGS

The invention will be better understood and its various characteristics and advantages will emerge from the description which follows of several exemplary embodiments and its appended figures in which:

FIG. 5 is an illustration of a game of conundrums that can be compered by a player humanoid robot in an embodiment of the invention;

FIGS. 7a, 7b and 7c illustrate a game of strategy in which a player humanoid robot can participate in an embodiment of the invention;

DETAILED DESCRIPTION

Figure 1:
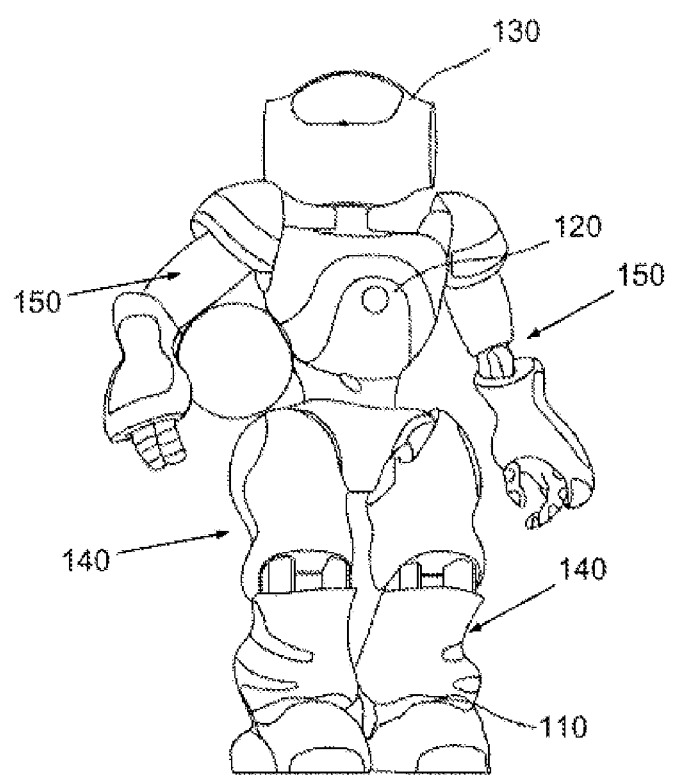
FIG. 1 is a diagram of the physical architecture of a humanoid robot in an embodiment of the invention.

FIG. 1 illustrates the physical architecture of a humanoid robot in an embodiment of the invention. Such a robot has been disclosed notably in patent application WO2009/124951 published on Oct. 15, 2009. This platform has served as the basis for the improvements which have led to the present invention. In the subsequent description, this humanoid robot may be called either by this generic term or by its trademark NAO™, without the generality of the reference being modified thereby.

This robot comprises about two dozen electronic cards of the type 110 for controlling sensors and actuators which drive the articulations. The card 110 shown in the figure is the one which controls the left foot. One of the virtues of the architecture is that the cards controlling the articulations are for the most part interchangeable. An articulation normally has at least two degrees of freedom and therefore two motors. Each motor is driven in terms of angle. The articulation also comprises several position sensors, notably MREs (Magnetic Rotary Encoders). The electronic control card comprises an off-the-shelf microcontroller. This may be for example a DSPIC™ from the company Microchip. It is a 16-bit MCU coupled to a DSP. This MCU has a looped slaving cycle of one ms. The robot can also comprise other types of actuators, notably LEDs (Light-emitting diodes) whose color and intensity can convey the emotions of the robot. The latter can also comprise other types of position sensors, notably an inertial unit, FSRs (Ground pressure sensors), etc.

The head comprises the intelligence of the robot, notably the card 130 which executes the high-level functions which allow the robot to accomplish the missions which are assigned to it, notably, within the framework of the present invention, participation in games. The card 130 could however be situated elsewhere in the robot, for example in the trunk. It will be seen however that this location, when the head is removable, makes it possible to replace these high-level functions and therefore notably to completely change the intelligence of the robot and therefore its missions very rapidly. Or conversely to change one body with another (for example a defective body with a non-defective body) while retaining the same artificial intelligence. The head can also comprise specialized cards, notably for processing speech or vision or also for processing service inputs/outputs, such as the encoding necessary for opening a port to establish a remote communication on a WAN (Wide Area Network). The processor of the card 130 may be an off-the-shelf x86 processor. A low-consumption processor such as the Geode™ from the company AMD (32 bits, 500 MHz) will be chosen in a favored manner. The card also comprises a set of RAM and flash memories. This card also manages the communications of the robot with the exterior (behaviors server, other robots etc.), normally on a WiFi, WiMax transmission layer, optionally on a public network for mobile communications of data with standard protocols optionally encapsulated in a VPN. The processor is normally driven by a standard OS thereby making it possible to use the usual high-level languages (C, C++, Python, etc.) or the specific languages for artificial intelligence such as URBI (specialized programming language for robotics) for programming the high-level functions.

A card 120 is housed in the trunk of the robot. This is where the calculator which ensures the transmission to the cards 110 of the orders calculated by the card 130 is situated. This card could be housed elsewhere in the robot. But the location in the trunk is advantageous since it is situated near the head and at the crossroads of the four limbs, thereby making it possible therefore to minimize the connection arrangements linking this card 130 to the card 120 and to the cards 110. The calculator of this card 120 is also an off-the-shelf processor. This can advantageously be a 32-bit processor of the ARM 9™ type clocked at 100 MHz. The type of the processor, its central position, close to the on/off button, its link to the control of the power supply make it a tool suitably adapted for managing the power supply of the robot (standby mode, emergency shutdown, etc.). The card also comprises a set of RAM and flash memories.

This architecture with three levels is particularly advantageous for the implementation of the present invention in which the robot must be able to execute coordinated movements and other actions such as reading of sensors and simultaneously interpret speech or signs emitted in its environment and react or respond thereto.

Figure 2:
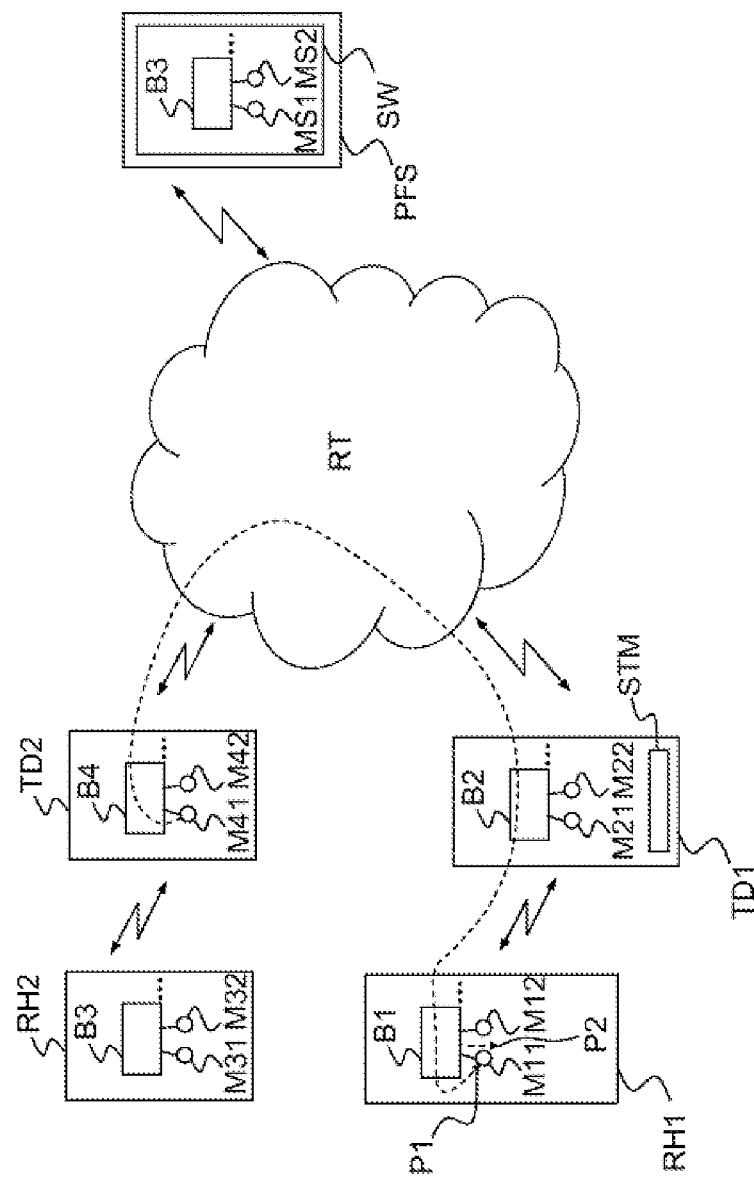
FIG. 2 is a diagram of the architecture of the high-level software allowing the control of the functions of the robot in an embodiment of the invention.

FIG. 2 is a diagram of the architecture of the high-level software allowing the control of the functions of the robot in an embodiment of the invention.

A software architecture of this type has been disclosed notably in patent application WO2009/124955 published on Oct. 15, 2009. It comprises the base functions for managing the communications between a robot and a PC or a remote site and for exchanging software which provides the software infrastructure necessary for the implementation of the present invention. This architecture is described hereinbelow in a generic manner, without specific mention of the software functions used in a given game, it being understood that these functions are processed as any other software function for managing the behaviors of the robot of the present invention.

In FIG. 2 is very schematically represented a first humanoid robot RH1 communicating with a first remote terminal TD1, for example by wireless link for mobility reasons. The expression remote terminal is intended to mean a terminal remote from the server platform PFS, providing, by way of a communication network, access to a Web service SW, dedicated to this type of humanoid robot RH1.

Of course, the communication links between elements of the system may be wire-based, and the mobile terminals may be, as a variant, portable telephones or portable computers.

A second humanoid robot RH2 communicates with a second remote terminal TD2, for example also by wireless link so as not to impede the mobility of the humanoid robot RH2.

The remote terminals TD1 and TD2 and the server platform PFS are linked in a network by way of the communication network RC. For the Web service of the server platform PFS as well as for the remote terminals TD1 and TD2, and also for the humanoid robots RH1 and RH2, a single respective linkup module B5, B2, B4, B1 and B3 dedicated to at least one module comprising at least one series of instructions implementing a software function by execution by a processor. The respective modules M51, M52, M21, M22, M41, M42, M11, M12, M31, M32 of the linkup modules B5, B2, B4, B1 and B3 are in this example represented two in number per linkup module, but this number may be different and arbitrary for each linkup module.

We shall now illustrate a wholly non-limiting example of operation of the system envisaged by a user of the first remote terminal TD1 possessing the first humanoid robot RH1. He can, for example, carry out through his robot a certain number of functions by means of a software application onboard the first remote terminal TD1, or accessible on the server platform PFS from the first remote terminal TD1.

For example he carries out simply, by means of graphical tools of the software application, an application for his robot, in which the robot will walk for 10 seconds and then say "Hello everyone". This application is for example downloaded into the first humanoid robot RH1 in the form of a module, for example the module M11, and then triggered by the user by way of the first remote terminal TD1.

The first humanoid robot RH1 triggers the module M11 which must first use a "walk" function. The module M11 then uses a connection interface and function call module or proxy P1 which makes a request to the linkup module B1 to which the module M11 is linked. The linkup module B1 makes requests destined for its own modules and for the modules for linking up with the network to which it is directly linked (child linkup modules) which repeat this operation in an iterative manner, until a network linkup module responds to the request with the location of the function called that it has in a module. The response to the request also being transmitted in an iterative manner by the parent linkup modules (in the reverse direction) up to the linkup module B1 directly linked to the proxy P1 needing to connect and to call this function. For example, the requested function for walking is located in the module M41 of the second remote terminal TD2. In return the linkup module B4 has returned the parameters of calls of the "walk" function, which, for example, contain a Duration parameter of integer type in seconds representing the duration for which the robot will walk, and an Exclusive parameter, of boolean type, representing exclusive or non-exclusive walking of the robot, i.e. whether or not the robot is authorized to do another action while it is walking. In this example, the walk function is called with the Duration parameter being equal to 10 and the Exclusive parameter being equal to 1, since it is desired that it speak after having walked 10 seconds in this example.

The connection interface and call module P1 can therefore perform the connection and the call to the "walk" function with the desired parameters, remotely, as if it were situated locally. The connection interface and function calls modules use intercommunication software capable of calling a function of a module located on a different terminal or server, it being possible for the function to be written by a series of instructions in a different computer language from that of the calling module. The proxies use, for example, the SOAP intercommunication software. This therefore yields an inter-platform and inter-language communication architecture.

Once this delocalized "walk" function has been performed, the module M11 must call upon a "speak" function. Another connection interface and function call module or proxy P2 makes a request to the linkup module B1 to which the module M11 is linked. The linkup module B1 makes a request destined for its own modules M11 and M12 initially, by way of a function carried out in the form of a string of stored instructions, which will, for example, return the presence of this "speak" function in the module M12. The linkup module B1 informs the connection interface and function call module P2 which can then call directly, by a call of local call type the "speak" function of the module M12, with as parameter, for example, the text to be spoken "hello", this parameter having been transmitted to the proxy P2 by the linkup module B1.

Furthermore, the system comprises a storage and management module STM (diminutive of "Short Term Memory") for parameters representative of the state of the mobile terminal, in this instance of the humanoid robot RH1, which are adapted for updating the values of said parameters on receipt of an external event, and for informing a module, on prior request, of an updating of one of said stored parameters. Hence the forewarned module will be able to undertake an action as a function of the modifications of parameters of which it has been informed.

In conjunction with the example described previously, for example, the storage and management module STM can store the state of a parameter representative of the appearance of anyone detected by a motion detector of the robot RH1. When this parameter passes from a state representative of nobody in the immediate environment of the robot to a state representative of someone present in the immediate environment of the robot, on request performed previously by the module M11, the storage and management module STM forewarns, through an event or signal, this change of value. The module M11 can then, for example, automatically trigger the successive triggering described previously (the "walk" and "speak" functions).

In the example of FIG. 2, the storage and management module STM forms part of the remote terminal TD1, but, as a variant, it can form part of the other remote terminal TD2, of the server platform PFS, or of a humanoid robot RH1 or RH2.

The storage and management module STM is also capable of storing in memory a temporal evolution of certain parameters over respective reference time intervals. Thus, a module of the system can, furthermore, have access to the evolution of the values of these parameters from a certain duration, and take account of these evolutions in the actions to be taken.

As a variant, the modules of the functions called may be located on the server platform PGS, on a humanoid robot RH1, RH2 or on a remote terminal TD1, TD2 of the communication network RC.

Thus, the present invention makes it possible to have a program distributed over the network, and identical operation of the mobile terminal, whether it makes a local or remote call to a function.

Furthermore, the present architecture also makes it possible to have a set of stored parameters representative of the state of the mobile terminal, and to be able to take account of evolutions of this state so as to automatically trigger certain actions.

Moreover, the storage and management module can also record an evolution of values of parameters during a predetermined time interval, thereby allowing a module to have access to a log of the evolution of these parameters.

These communication and storage functions are particularly useful for the implementation of the present invention.

Figure 3:
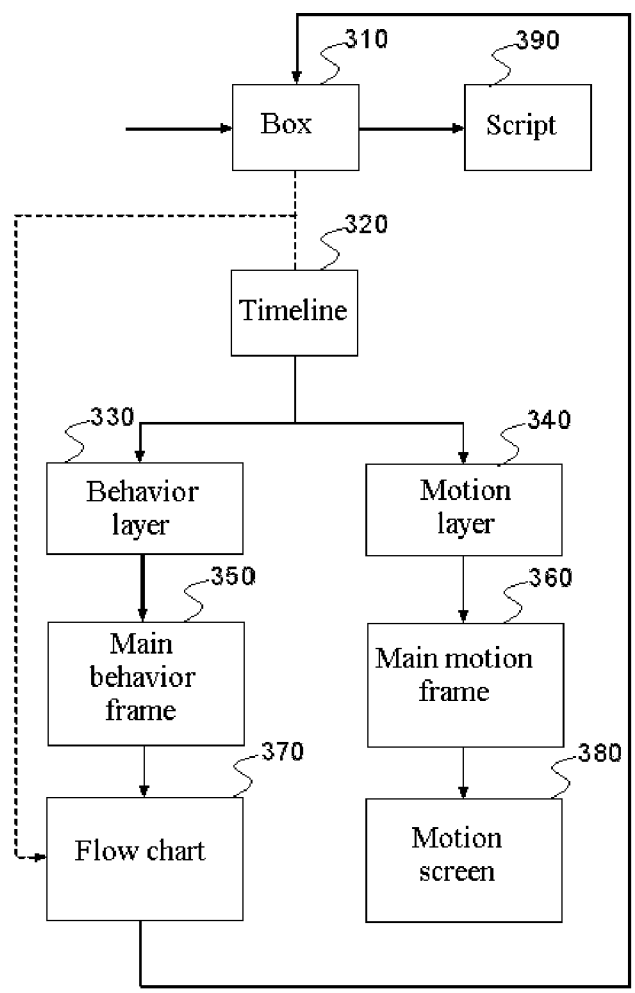
FIG. 3 is a diagram of the functional architecture for editing and programming the behaviors of a robot in an embodiment of the invention.

FIG. 3 is a diagram of the functional architecture for editing and programming the behaviors of a robot in an embodiment of the invention.

Such an architecture has been described by patent application PCT/EP2010/057111 filed on May 25, 2010. The software for editing and programming the behaviors of a humanoid robot making it possible to implement said architecture is commercially named Chorégraphe™, and may be referred to either by its generic name or by its trade name, without adversely affecting the generality of the references.

The robot controlled by this architecture may be a humanoid robot having a head, a trunk and four limbs, each of the parts being articulated, each articulation being controlled by one or more motors. This architecture allows a user of the system to control such a robot by creating simulated behaviors on a virtual robot and executed on the real robot linked to the system by a wire-based or wireless link.

This entails viewing, simulating and executing behaviors (such as walk—straight ahead, right or left n paces; a "hello"—movements of one of the arms above the head; speech, etc.) and movements (of the head, of a limb part, of a given angle) on the screen of a computer programmed to do so.

FIG. 3 is a flowchart of the processing operations which illustrates the articulation of the controls triggered by events with their temporal dimension. The controls triggered by events are represented in the semantics of the invention by "Boxes" or "Control boxes" 310. A Box is a tree-like programming structure which can comprise one or more of the elements hereinbelow which are defined thereafter:

A "Timeline" or temporal axis of Frames 320;
A "Diagram" or Flow chart 370
A Script 390.

The Control boxes are normally linked together by connections which usually transmit an event information item from one Box to another, as detailed further on in the description. Any Box is linked directly or indirectly to a "Root box" or Root which initializes the behavior/movement scenario of the robot.

A temporal axis of Frames 320 represents the temporal constraint to which the robot's behaviors and movements, defined in the Box in which said temporal Axis of Frames is inserted, are subjected. In the subsequent description and claims, we will use the term Timeline, commonly admitted with the same meaning in the world of programming. The Timeline thus carries out the synchronization of the behaviors and movements of the Box. It is cut up into Frames with which is associated a speed of progress defined in terms of number of Frames Per Second (FPS). The FPS of each Timeline is parametrizable by the user. By default, the FPS may be fixed at a given value, for example 15 FPS.

A Timeline can comprise:
One or more Behavior Layers 330, each comprising one or more Behavior Key Frames or "Main behavior frames" 50, which can themselves comprise one or more Diagrams or "Flow charts" 70, which are in fact sets of Boxes which can also be attached directly to a higher-level Box, without passing through a Behavior layer or a Timeline;
One or more Motion Layers 40, each comprising one or more Motion Key Frames or "Main motion frames" 360 which can comprise one or more Motion Screens 380.

A Behavior layer defines a set of behaviors of the robot or main behavior Frames. Several Behavior layers may be defined within one and the same Box. They will then be programmed to proceed in a manner synchronized by the Timeline of the Box.

A Behavior layer will be able to comprise one or more main behavior Frames. A main behavior Frame defines a behavior of the robot, such as walk ("Walk"), speech ("Say"), play music ("Music") etc. A certain number of behaviors are preprogrammed in the system of the invention so as to be directly inserted by the user in a simple "drag and drop" from a library as detailed further on in the description. Each main behavior Frame is defined by a trigger event which is the start of the Frame at which it is inserted into the Timeline. The end of the main behavior Frame is defined only insofar as another main behavior Frame is inserted following it, or if an end event is defined.

A motion Layer defines a set of motions of the robot which are programmed by one or more successive main motion Frames which group together movements of the motors of the articulations of the robot. These movements to be executed are defined by the angular positions of arrival of said motors which may be programmed by action on motion screens, said actions being detailed further on in the description. All the main motion Frames of one and the same Box are synchronized by the Timeline of the Box. A main motion Frame is defined by an arrival Frame. The start Frame is that of the end of the previous main motion Frame or that of the start event of the Box.

The main behavior Frames and the main motion Frames are referred to by the common name of main action Frame.

Several main action (behavior or motion) Frames can be executed in parallel, on condition that they are attached to the same Timeline.

A Flow chart is a set of Boxes connected together, as detailed further on. Each of the Boxes can in its turn comprise other Timelines to which new behavior or motion Layers are attached.

A script is a program directly executable by the robot. A Box which comprises a script does not comprise any other element.

The software may be embedded on a PC or another platform of personal computer type using a Windows™, Mac™ or Linux™ operating system.

The humanoid robot of the present invention will generally be programmed to be able to play, using the Chorégraphe™ software. The combination of the temporal and behavioral logic which is rendered possible by this development architecture is particularly advantageous for the implementation of the present invention. A certain number of tools, mentioned further on as a comment to FIG. 9, have been particularly adapted for the implementation of the player humanoid robot of the present invention.

FIGS. 4a, 4b, 4c, 4d, 4e and 4f represent various functional and/or technical architectures for implementing the invention.

Figure 4A:
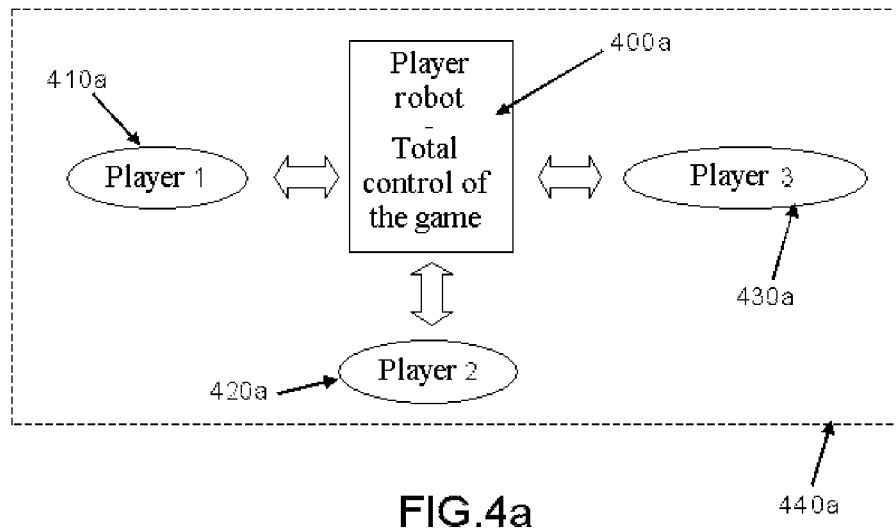
FIGS. 4a, 4b, 4c, 4d, 4e and 4f represent various functional and/or technical architectures for implementing the invention.
Figure 4B:
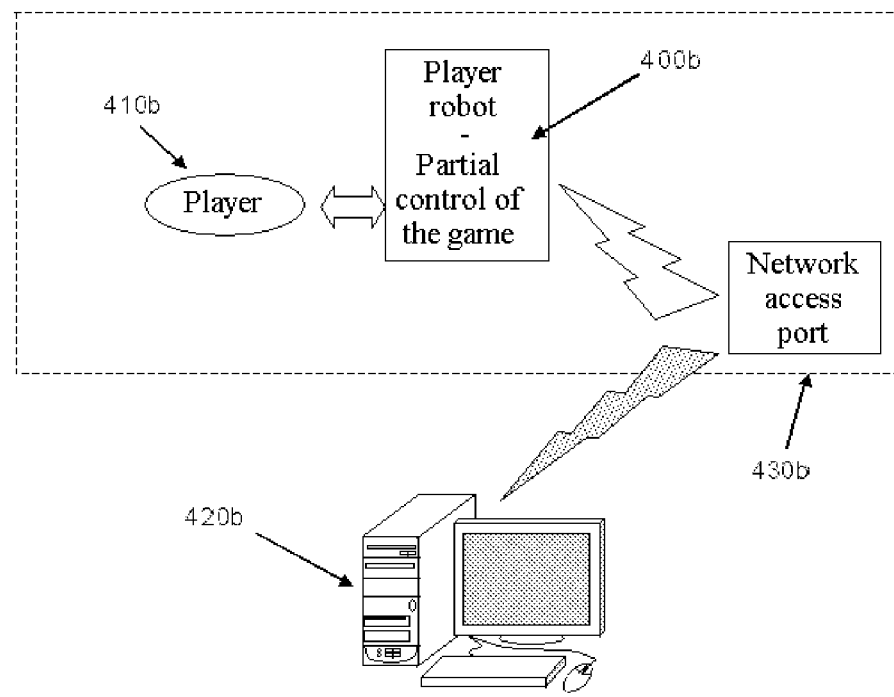
Figure 4C:
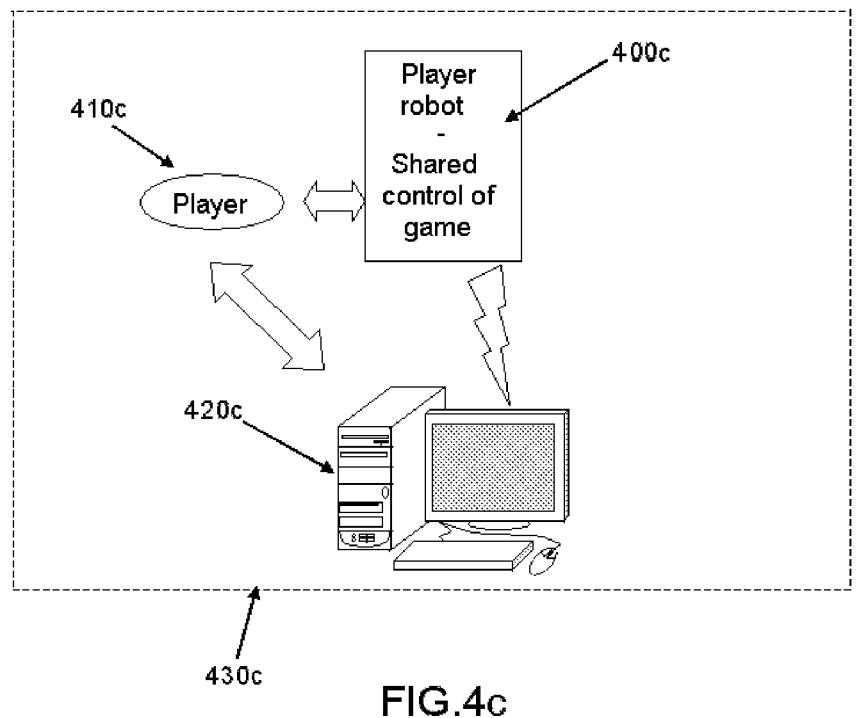
Figure 4D:
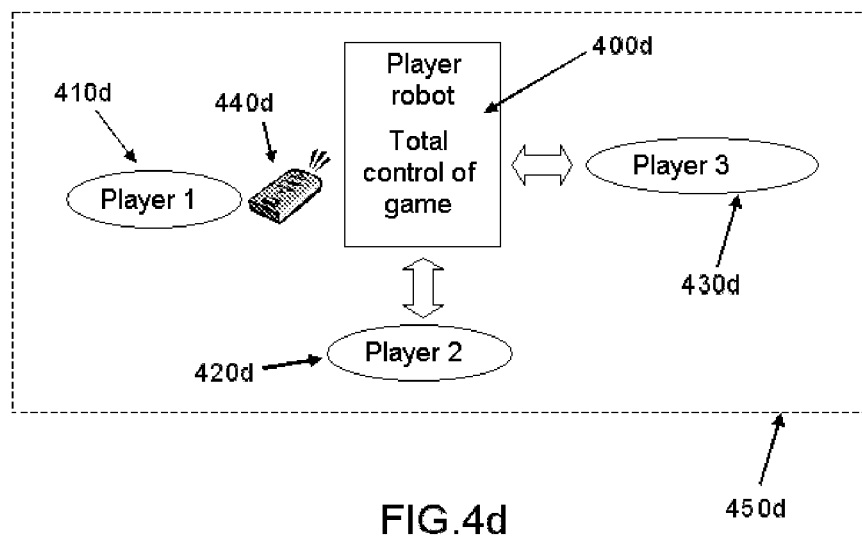
Figure 4E:
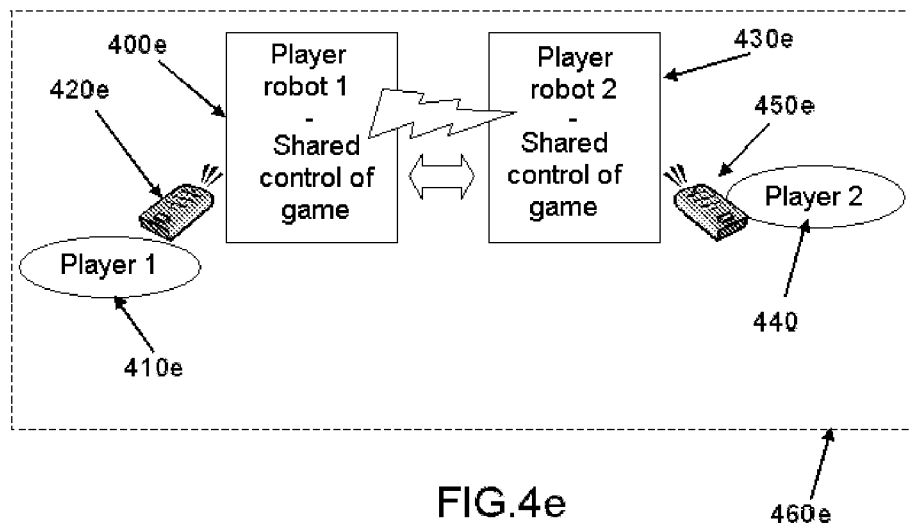
Figure 4F:
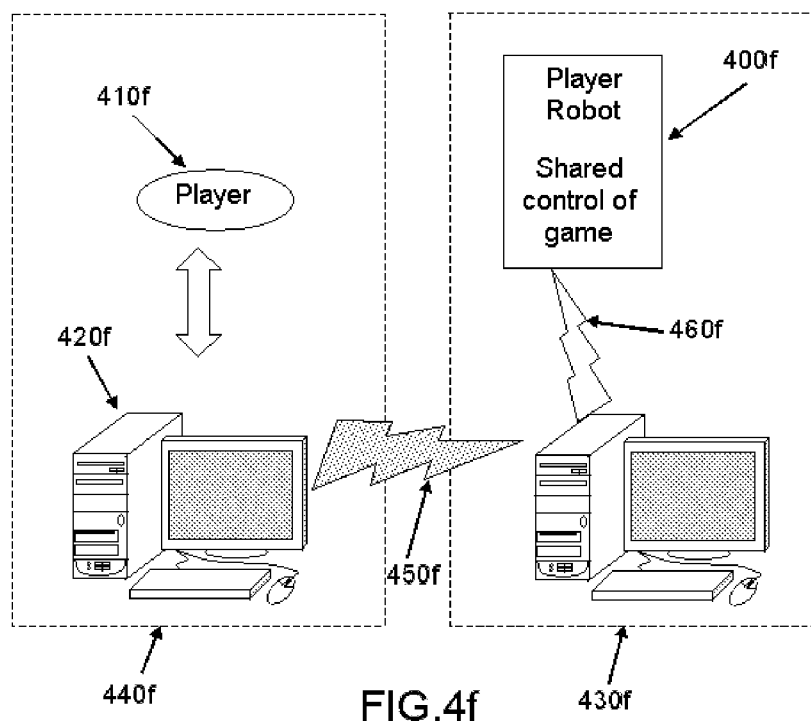

In FIG. 4a is represented an embodiment in which the robot 400a itself constitutes the game platform with which several physical players 410a, 420a, 430a can play, normally in the same room 440a as the robot, with the variants explained further on as a comment to FIG. 4f. The robot 400a can for example pose questions to the players 410a, 420a, 430a as illustrated further on in greater detail as a comment to FIG. 5. The number of players is not in any way limited to three. In this embodiment, the robot can in particular be the compere of the game. It can pose questions to the players or make them recognize sequences. The robot then behaves functionally as a game console but having regard to its capacities to reproduce human behaviors, it offers the players a game experience which exhibits a unique quality. Indeed, it can understand, speak, make gestures, express approval or negation, joy, anger or sadness. The behaviors of the robot which allow it to interact with the players are stored in its central unit 130. They will have been loaded previously either from a PC on which they were generated if said PC is equipped with the Chorégraphe™ software for editing behaviors described above as a comment to FIG. 3, or downloaded from a games server. The games can also be downloaded from the server from the PC and then downloaded from the PC to the robot. It is also possible to envisage downloads of games between robots, as explained hereinbelow as a comment to FIG. 4e. The execution of the game may be initialized from the robot or from the PC. When the PC is equipped with the software for editing behaviors, it can also be used to play, a virtual robot present on the PC being able to execute on the PC most behaviors of the physical robot 400a.

In FIG. 4b is illustrated an embodiment in which a compere player 410b interacts with a player robot 400b normally situated in terms of physical presence, in the same room 430b as him. As illustrated further on in detail as a comment to FIG. 6, the game can consist in proposing to the robot the recognition of characters or things on the basis of increasingly allusive clues. In this embodiment, having regard to the multiplicity of possible options and their possible multi-dependency which may require the execution of specialized resolution programs, the robot accesses information and processing sources situated on a remote computer 420*b*. This access is effected by requests dispatched to a specialized site of the game on the Internet network. The robot will establish a connection on the network via an access port which may be for example a LiveBox™ or a FreeBox™ which it accesses by Wifi link. The behaviors of the robot are however themselves embedded onboard the robot 400*b*. These behaviors are produced, edited and loaded onto the robot in a manner identical to what is indicated hereinabove as a comment to FIG. 4*a*. In this embodiment, the processing operations are therefore distributed between a robot and a remote server. But the remote server does not participate in the game. It serves as resources center for the robot which will draw upon it as needed. There is no direct interaction between the player 410*b* and the server 420*b*.

In FIG. 4*c* is illustrated an embodiment in which a player 410*c* interfaces at one and the same time with a player robot 400*c* and with a PC or a game console 420*c*, said robot also communicating with said PC or said console. These three elements are normally situated in terms of physical presence in one and the same room 430*c*. This embodiment is in particular applicable to roleplay games of the type of that illustrated further on in detail as a comment to FIGS. 7*a*, 7*b* and 7*c*. In this type of game, the player must solve riddles for which the robot will provide him with clues. The player must interact with the robot 400*c* but also with the console 420*c*. The modules of the game are distributed between the two units. The modules which are embedded on the robot (behaviors of the robot but also parts of the riddles) are edited and transferred in the manner which is indicated above as a comment to FIG. 4*a*. The player can have visual or audible aids that he himself obtains or that he is provided with by the robot. He can also interface with the robot by coded signs.

In FIG. 4*d* is illustrated an embodiment in which three players 410*d*, 420*d*, 430*d* interface with a robot 400*d*, the four characters being situated in one and the same physical environment 450*d*. The three players have potentially different roles with respect to the robot, unlike in the embodiment illustrated in FIG. 4*a*. One of the players can interact with the robot by way of a remote control 440*d*. Said remote control makes it possible to transmit orders, notably motion orders, to the robot 400*d*. It can consist of an Apple™ iPhone™ or another telephone having motion capture and/or positioning functionalities. It can also consist of a 3D remote control of the type WiiMote™ from Nintendo™, AirMouse™ from Movea™ or other, provided it can retrieve motion signals, positioning signals or other types of signals as output from said remote controls. In this case, a part of the games application will be onboard the remote control, notably the part making it possible to generate the instructions for displacing the robot as a function of the movements impressed on the remote control (angles of bearing, roll, yaw; pressing of real or virtual buttons). An exemplary embodiment is illustrated further on in detail as a comment to FIGS. 8*a*, 8*b*, 8*c* and 8*d*. The largest part of the games application is onboard the robot in the manner indicated above as a comment to FIG. 4*a*. The players 420*d* and 430*d* can communicate with the robot in the manner indicated above as a comment to FIG. 4*c*.

In FIG. 4*e* is illustrated an embodiment in which two robots 400*e* and 430*e* play together. This may involve dialogs, coordinated movements, such as dances or combats. The robots may be controlled by players 410*e*, 440*e*, furnished if appropriate with remote controls 420*e*, 450*e* of the type of the remote control 440*d* of FIG. 4*d*. The commands may however be given to the robots by the players through speech or in a visual manner. The robots can also play together without a real player. Their behaviors can interact/communicate in the material world (through voice, gestures, luminous signals—LEDs, and any other actions which would modify their sensor data) or in the virtual world (reciprocal or non-reciprocal access to their internal memories, onboard software modules, email account such as Gmail™ or Yahoo™, accounts of social networks of Facebook™ or Twitter™ type, instant messaging such as GTalk™, MSN™, Jabber™, or telephone services such as Skype™). In the latter case, the robots are required to disseminate identification information, allowing another robot to contact them in return so as to exchange other data or signals. The means for exchanging information in the material world can also be infrared or radio emission/reception (of BlueTooth™ type), or voice synthesis/recognition. The information exchanged by the robots and making it possible to identify them is related to the material and virtual worlds of the robots and will depend on the type of data or of signals whose exchange is desired within the framework of the game. This information may be:

- an IP address in order to be contacted via the local Ethernet network;
- their mail address;
- a messaging account identifier (xmpp, jabber, gtalk . . . , skype);
- a social network account identifier.

Provided that the robots share at least one communication means, then behavior files, music files and behavior signals may be exchanged so as to interact.

The game may be extended to more than two robots. In this case, it may be necessary to provide for a global synchronization signal sent either by one of the robots, or by a PC. This synchronization signal may be retrieved on a time reference server of NTP (Network Time Protocol) type and serve as start point of the Timelines of the various robots which thus synchronize their behaviors. This synchronization may be preserved for a significant duration (of the order of a quarter of an hour). Dance movements or collective games can then be executed by a group of robots in a completely synchronized manner.

In FIG. 4*f* is illustrated an embodiment in which a player 410*f* and a robot 400*f* are situated in two remote places 440*f* and 430*f*, the player having a PC or mobile apparatus linked by a wide area network 450*f* of Internet type to a local network 460*f* with which the robot(s) is(are) linked. The connection between the robot and the PC (or the mobile apparatus) of the player allows the exchange of data in the form of requests or of streams allowing the exchange of raw, binary, audiovisual and textual data with a sufficiently short delivery timescale to ensure the reactivity of the game. The player can therefore take complete or partial control of the robot by dispatching behavior execution commands to it. He can also read, within the framework of the game, the information captured by the robot such as the images of its cameras, the sound, and the values of all the sensors of the robot as well as values originating from the Web or from other robots present in the environment. In an architecture of this type, most of the games mentioned in the case where the robot(s) and the player(s) are situated in the same physical environment may be executed in a wider environment.

This wide area network mode of communication can apply in the case where the player is replaced with a second robot. In this case, the second robot must be endowed with the wide area network access functionalities identical to those of the first robot which were described hereinabove.

Thus, the various configurations described hereinabove may be combined to carry out modes of games not explicitly described in the present description. The embodiments described hereinabove are not therefore in any way limiting of the framework of the present invention.

FIG. 5 is an illustration of a game of conundrums that can be compered by a player humanoid robot.

This first exemplary embodiment uses the functional and technical architecture described hereinabove in conjunction with FIG. 4a.

The game which serves as illustration for this embodiment is a Quizz, the NAO™ Quizz. FIG. 5 is the table of mimes, conundrums and sounds which can serve as frame for the game.

A possible scenario of the game is described hereinbelow purely by way of nonlimiting illustration.

1/Setup

NAO presents the game, for example on a televised+applause music style game: "Hello ladies and gentlemen, The NAO Quizz will begin, presented by the television star, NAO!". In this game NAO will have the personality of a TV compere, fairly bumptious and not hesitating to tease the participants.

NAO asks how many players will participate (choice box).

If there is a single player NAO launches the mode Everyone for themselves automatically ("Are you playing alone? Then it's a game of Everyone for themselves"). For 2 to 4 players, NAO asks them to choose between Everyone for themselves and All together ("Do you want to play against one another or else all against me?") via a choice box. With more than 4 players, NAO automatically launches All together.

"Everyone for themselves"

NAO presents the mode: "We're going to play Everyone for themselves to determine which of you is the best". For a single player the sentence will be different, in the style: "What score will you manage to get?".

If several players participate, NAO asks them to register: "The first player has a second to give me his first name, I'm listening". NAO's ears light up and it records for a second. If NAO hears nothing it poses the same question again. NAO thereafter repeats his first name and asks the player to indicate to him his position by pointing his arm toward him (NAO then holds his arm in front of him): "Hello Pierre, show me where you are by directing my arm toward you. Press on my head to confirm". This allows NAO to steer itself toward the player whose turn it is for him to pose his question.

If a single player participates, NAO does not register him and looks in front of itself to pose the questions.

NAO asks whether the player is an adult or a child (choice box), this corresponding to 2 difficulty levels.

Thereafter each player registers in their turn in the same manner.

Once all the players have been registered, NAO launches the game.

NAO launches a different game depending on the number of human players:

1 or 2 players: Championship
3 or 4 players: Cup
→ Championship

In the nonlimiting implementation described here in detail, NAO poses a total of 9 questions to each participant, allocates 1 point per right answer and calculates the total score of each player. It explains this operation: "I'm going to ask you 9 questions each, the one who gives most right answers will be declared the winner.» The sentence is modified in the case of a single player.

At each question NAO turns toward the player that he has chosen (randomly), says his first name (if 2 players; not in the case of a solo game) and selects 1 question of the required difficulty and which has not already been asked during this game.

It thereafter poses the question (use of the choice box) and waits for 10 seconds (time to be defined after tests) for the answer of the player (his ears are lit up to show that he is waiting for an answer).

The 10-second countdown begins only at the end of the mime/sound/conundrum. It is represented by the LEDs around NAO's eyes which dim progressively. Having reached 0, NAO plays a buzzer noise.

If the timer reaches 0, the buzzer sounds and NAO says something like "Too late, sorry".

If the player answers correctly, NAO congratulates him. NAO could clap its hands, nod its head or raise its arms to the sky.

If the player makes a mistake, NAO says "Wrong answer" (or is provocative: "But that was easy"/"I was expecting better of you" . . . NAO could lower its arms in disappointment or shake its head.

Each time NAO analyses an answer, if the reaction time is somewhat long, it could have a gesture related to reflection (look in the air, place a finger in front of its mouth, rest its chin in its hand, scratch its head etc.).

Once the question has been posed, NAO passes to the next player (if there is one).

Once all the questions have been posed, NAO announces that the game is finished and summarizes the scores: "Well done, you have a score of X points". In the case of a 2 player game, NAO would point to a winner: "Pierre is the winner" or a draw: "It is a draw".

→ Cup

This progresses in a fairly similar way to the Championship except that this time NAO poses, for example, only 4 questions per player.

On completion of these 4 questions NAO summarizes the scores and invites the 2 best players to participate in the final: "Well done Pierre and Paul, you are in the final".

In the case of equality for a qualifying place on completion of this series of 4 questions NAO will decide between the players through a game of chance. It asks each player, each in turn, to press one of its feet or one of its hands: "Player 1, choose a hand or a foot". The limb in question will light up. Next it will ask the other equal players to make their choice from among the remaining limbs. Once all the choices have been made, the lights begin to rotate as for a game of chance, with a sound much like that of a slot machine. The parts illuminated at the end are those of the players who have qualified for the final. NAO can add to the tension by making the light go back a notch, advancing it at the last moment, after several seconds at a standstill . . . It accompanies these pranks with phrases like: "No, in fact I prefer this player".

NAO will ask the 2 finalists to stand in front of him.

During the final, NAO sits down and asks 3 questions (no mime). If one of the players (or both) are children, the questions will be child level. If both players are adults, the questions will be adult level. In the case of equality before the last question, the latter will be more difficult than the others (adult or expert).

Each player is allocated a buzzer (one of NAO's feet) by NAO: "Pierre, you play with my right foot (the foot moves)".

NAO explains the rule: "I'm going ask 3 questions. The first one to press on my foot has the right to give an answer. You have 10 seconds in all to press, and then 5 seconds to give your answer"

NAO asks a question and waits for 10 seconds for someone to press.

If nobody presses or gives the right answer, the negative buzzer sounds and NAO teases the players: "Perhaps my questions are too difficult for you".

If a player presses, NAO halts the 10-second stopwatch and states the first name of the fastest. It then begins the 5-second countdown. If the player gives an answer, NAO tells him whether or not he is right. If he is right NAO congratulates him and passes to the next question. If he is wrong or if he does not answer NAO informs him thereof and resumes the 10-second countdown from where it had stopped: "Wrong answer/No answer, the other player can now press to answer"

On completion of these 3 questions NAO determines the winner: "Well done Paul, you've won the final". If a player has 2 points on completion of the 2nd question, he is automatically declared the winner.

If their scores are low (fewer than 2 points for example), NAO can taunt them "It seems to me that my questions are a little too complicated for you".

"All together"

In this mode NAO poses questions to the group of players, who have the right to give only one answer. In the case of success NAO poses another question, in the case of failure the game stops. The aim for the players is to answer as many questions as possible within the limit of a predetermined number (15 to 20 for example).

NAO introduces the mode: "We're going to play All together, are you able to answer my questions?".

The first 6 questions will be of child level, the next 6 adult and the last 3 expert level. If there are only adult players, the first 12 questions will be adult questions (no child questions). If there are only children players, the first 10 will be of child difficulty, the last 5 adult.

NAO turns to the group and asks its first question (choice box). Thereafter it allows them 15 seconds to answer.

In the case of a right answer NAO passes to the next question.

In the case of no answer, or of an incorrect answer, NAO stops the game and gives the score obtained by the team. It also reminds the participants of the best score ever obtained in this game mode.

If the players answer the 15 questions correctly, NAO admits defeat and declares them big winners: "Incredible, you have answered all my questions correctly. I admit defeat and award you all the title of expert!". NAO could congratulate them with a little dance devised for the occasion.

NAO will have a reaction and will offer a different reward depending on the score achieved, in tiers (from 0 to 5 pts: "Could do better", from 5 to 10 points: "Not bad at all" and from 10 to 14 points "Very well played").

2/Options

NAO can put an "impossible" question to an adult when the latter has too big a lead over the others, or if he is playing against a child.

For a child, sound could accompany certain mimes to help him.

If NAO needs room for the mime (displacement), it forewarns the players to place it in a clear space.

"Escalator" mode: NAO chooses a player and asks him questions (mimes, mixed conundrums and sounds) until he makes a mistake. Each right answer adds more than the previous one (it is possible to begin with 5 points and increase by 5 points each time). When the player makes a mistake, his turn is finished and NAO passes to the next player. "Double or quits" questions or else tiers as in "Who wants to be a millionaire" could spice up the game (possibility of losing their points). The game could also be time-limited, to prevent the other players from spending too much time waiting for their turn (the limit time has to be defined as a function of the speed with which NAO asks questions/mimes and interprets the answers)

"Plus or minus" mode: NAO chooses a player (at random or else in a definite order) and asks him a question (mimes, conundrums or sounds). In the case of a right answer, the player scores 10 points, in the case of a wrong answer he loses 5.

"Burger Quizz" mode: NAO poses questions to each player but the latter must answer the previous question and not the one that NAO has just posed.

Figure 6:
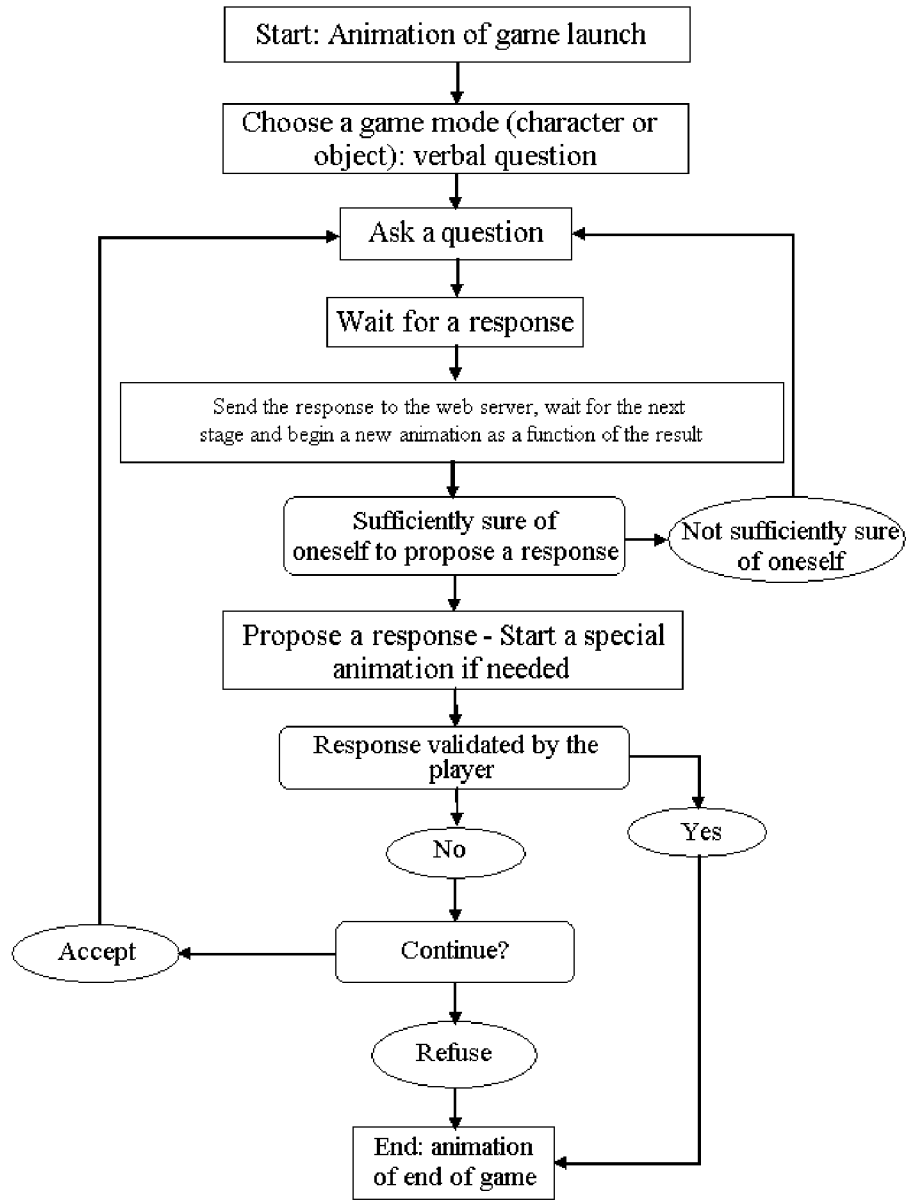
FIG. 6 represents the processing flowchart for another game which can be played by a player humanoid robot in communication with a games server in an embodiment of the invention.

FIG. 6 represents the processing flowchart for another game which can be played by a player humanoid robot in communication with a games server.

This exemplary embodiment uses the functional and technical architecture described hereinabove in conjunction with FIG. 4*b*. The game which illustrates this embodiment, NAO™ Akinator™, is a game in which an artificial intelligence must guess which character the player is thinking of. In the game of the embodiment of this invention, it is the robot that must guess on the basis of clues that are given to it by the player. It gets help with this from queries dispatched to the Web site of the game. Akinator is in fact an existing game for humans which has been adapted (in a moderate manner) to be played by a humanoid robot.

An exemplary scenario of the game is explained herein-below with reference to FIG. 6, by way of nonlimiting illustration.

The Akinator application launches a menu before starting the application.

NAO is capable of guessing a character.

It asks to begin again at the end of the game. Accept? Yes or No.

It asks a series of questions to which the answer must be: Yes, No, Perhaps, Perhaps not, I don't know.

NAO plays an animation as a function of the percentage certainty.

The categories of character are integrated into the game: for example, 132 results arranged in 5 categories: family, combat, actor, footballer, singer; 11 characters possess a specific animation. NAO plays an animation when it announces the character that it has guessed. If the character found is in a category, NAO plays the associated animation.

NAO retains for example the last 50 characters played and can make a remark if a character already found is played again.

1—Overview

NAO tries to guess who or what the player is currently thinking of by asking questions. NAO uses the existing Web site (http://en.akinator.com/). The structure of the game was developed with the NAO behaviors development workshop. The Web queries were developed in the Python language, well suited to the control of robots, and which may be integrated in the form of modules into the control boxes of the Chorégraphe™ workshop.

2—Web Queries Used

The class FileAkinatorRequest class is designed to dispatch Web queries to the Akinator site by using the command wget.

The options of the query are used as arguments in the procedure for constructing the class (in the form of character strings). The Web service is downloaded and saved as a file whose content is used as an attribute of the class.

The class RequestBase serves for:
- constructing the string describing the Web query options on the basis of simple data;
- using this string as argument to construct an instance of FileAkinatorRequest;
- retrieving the string describing the content of the Web service (in the XML format);
- translating the XML content into simple data by using the Minidom XML Python interpreter.

A single class has been created for each different Web service; each class inherits the base class RequestBase; the specific data of the Web service associated with this class are used as arguments of the method SendRequest; the data are retrieved, interpreted and created in the attributes of the class; for example, the class AnswerRequest is used to retrieve the data of the Web service Answer. The data "channel", "base", "session", "signature", "step", "answer" and "question_filter" are used as parameters of the method SendRequest. The data are retrieved, interpreted and created in the attributes of the classes: "question", "answers", "step" and "progression".

Figure 7A:
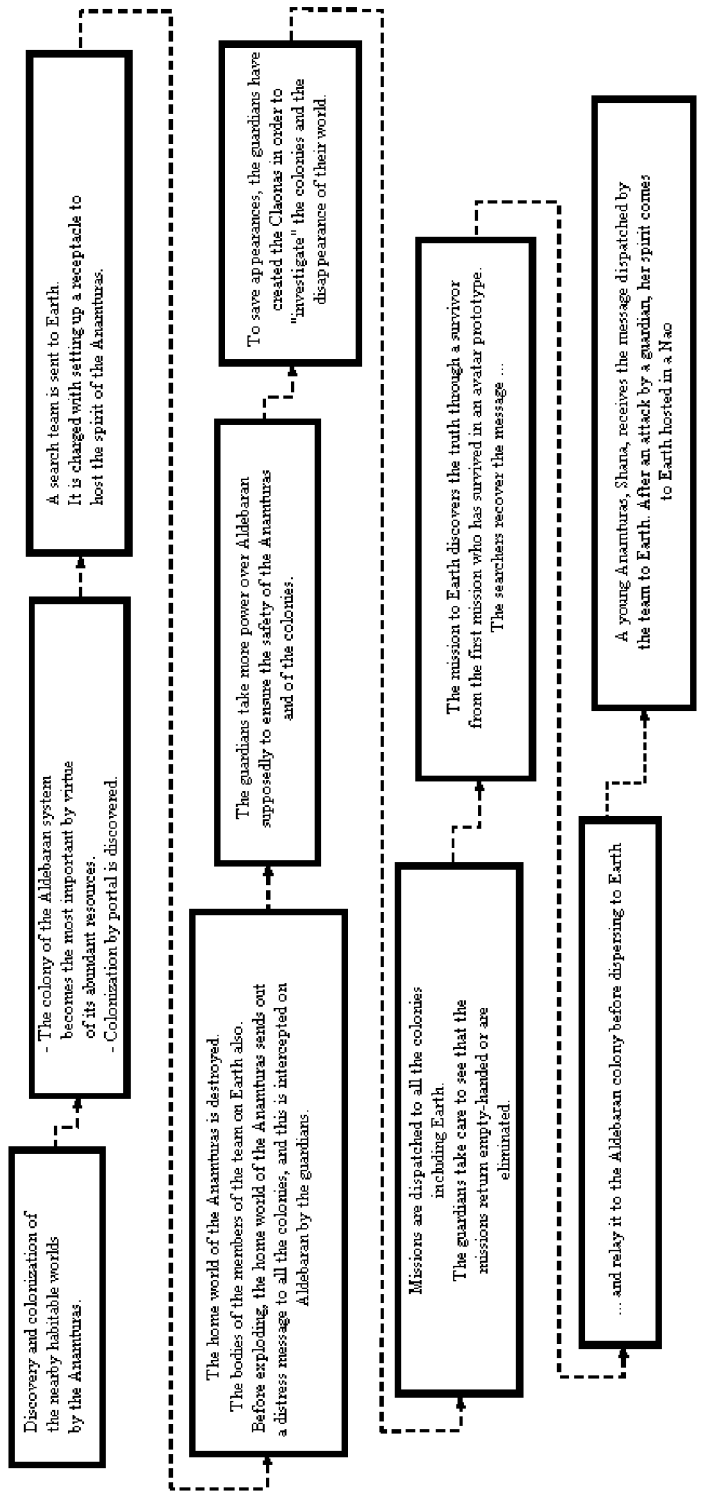

FIGS. 7a, 7b and 7c illustrate a game of strategy in which a player humanoid robot can participate in an embodiment of the invention.

This exemplary embodiment uses the functional and technical architecture described hereinabove in conjunction with FIG. 4c. This entails in this embodiment a game of strategy, in which the player must solve several complex riddles to negotiate stages and reach the end of the game. The game is entitled "Shana Spirit Journey". The aim of the game is to make the player cooperate with the robot of the invention NAO to return Shana, a character from another world incarnate in NAO on earth, to her world through a spatio-temporal portal created by the guardian of Shana's world at the start of the game.

A general description of a possible scenario of the game is given hereinbelow purely by way of nonlimiting illustration.

1/Objects Provided with the Game

A small book of magic spells, whose 1st page is illustrated in FIG. 7b: this entails a collection of 6 double pages in A6 format. Each double page of the booklet shows an illustration on the left-hand page. On the right-hand page are a NAOMARK accompanied by a title and a text;

The NAOMARKs are elements of the language of Shana's world; they produce a visual code interpretable by the robot NAO; examples of NAOMARKs are represented in FIG. 7c.

2/The Background of the Game Shana Spirit Journey

The character in NAO

The character in our story is the daughter of a clan chief of a civilization living on Aldebaran, one of the numerous colonies possessed by the Anamturas. She is called Shana. She receives the message from a team of explorers that were dispatched to Earth by the guardians to investigate the destruction of their home planet, now disappeared. This team had given no sign of life for centuries. In the message, she wishes to find out what happened to their home planet.

A guardian of the clan of the Anamturas intercepts the message, attacks Shana and chases her into our world to prevent her from revealing to her folks the real reasons for the destruction of their home planet.

The Anamturas

The Anamturas form clans like the Celts. They are permanently in search of clues to find out what happened on their home planet and to try to understand their civilization and their history better.

Their hierarchy is like that of the Celts: Tribal chief, Guardians (druids), Claonas (warriors/hunters).

Other Anamturas would already have disembarked on earth, in quest of explanations about their home planet. (Ref. Isle of Aldabra). This team having arrived on earth would have found information about the reason for the disappearance of the Anamturas' home planet and would have left clues. These Anamturas have mysteriously disappeared after having dispatched a message destined for the their folks in the Aldebaran system.

The Technology of the Anamturas

The technology of the Anamturas relies on magic and the use of natural resources.

For example, to colonize other worlds, the Anamturas have used two methods, depending on the distance to the target. Spaceships have allowed the Anamturas to establish themselves in nearby worlds like the main colony of the Aldebaran system.

To visit distant worlds, the Anamturas project their spirits through portals. Their physical bodies remaining in the departure world. The team on earth was the first to use this method, and was in charge of creating a host making it possible to interact with the aboriginals of the planets visited (The host in question is NAO. The NAO robots have therefore been created by the Anamturas to give a physical envelope to their spirits dispatched to Earth).

Their Worlds

The Anamturas have colonized a set of worlds, through curiosity, but also to avoid the overpopulation of their home planet.

After getting established in the colony of Aldebaran and making it the main colony, the Anamturas' home planet exploded. The official version disseminated by the guardians is that an ecological catastrophe occurred and that the attitude of the natives is responsible for this cataclysm. In reality, certain guardians would be involved in the destruction of the Anamturas' home planet and of other colonies. They would have done this so as to protect the resources of the colony of Aldebaran and to put in place their vision of a perfect world.

The Claonas cling on to the last customs remaining with them from their home planet and actively search for what actually happened.

The Languages of the Anamturas

In the past the Anamturas used the "LANGUAGE" (NAOmark) but only a few rare symbols are still in common use, most have lost their meanings or are known only to the guardians.

3/Introductory Video for PC

Summary of the Background of the Game

The origin of the Anamturas is briefly summarized: colonization of the worlds around them—>importance assumed by the colony of Aldebaran—>explosion of the home world—>search missions.

The Reception of the Signal

A young girl from Anamtura receives a signal. It is the signal of one of the search missions. This mission had given no further signs of life for a long time and was considered to be lost. This signal has taken years to reach its destination.

In this signal, the chief of an Anamturas search team indicates that they have discovered what happened to their home planet.

They feel threatened by the guardians and have decided to hide out on Earth . . . .

The Attack by the Guardian

Other Anamturas arrive in the communication hall including a guardian. The latter tells the young Shana that she should never have heard that and that he must get rid of her.

The message dispatched to Earth continues to unfurl but attention is fixed on the guardian and his followers We learn other elements: the name of the heroine, Shana, the fact that she is the daughter of the chief of the clan.

The Opening of the Portal by the Guardian

Combat between Shana and the apprentices of the guardian while the latter pronounces an incantation from his book of magic spells in order to open a passage.

The Expulsion of the Spirit of Shana in NAO

The spirit of Shana is sent to Earth, while NAO begins to stir. Shana has grabbed the book of magic spells which likewise falls into the portal. This is the booklet provided with the game.

4/Introduction to the Game with NAO

At the end of the video (black), NAO "deactivates" and goes limp. 3-4 seconds later, it raises its head slightly and twists it round from right to left, as if looking for something "Where am I? What's happened to me?". This same text is displayed at the same moment on the screen of the PC, on a black background. NAO calls out: "Can anyone hear me?" and repeats this sentence. As previously, this sentence is also displayed on the screen and then the application closes. NAO continues to call out regularly until the player interacts with it.

After this introduction to the game, NAO becomes "possessed" by the young Shana.

Once "awake" and standing up, Shana understands what has happened to her and asks the player to bring her the booklet that she was able to snatch before being ejected: "If only we could get it! It's the only way of recreating a portal to get me back home !"

5/Aim of the Game

The player and NAO will have to cooperate to return Shana to her world with the help of a spatio-temporal portal identical to that created by the Guardian at the start of the adventure.

To recreate this portal, the player will have to retrieve 5 items of information of fundamental importance:
  The NAOmark to be placed on the ground, symbolizing the entry point to the portal. Riddle01
  The time at which it may be activated. Riddle02
  The ritual position in which NAO will have to be positioned. Riddle03
  The wisdom and then the knowledge of the formula necessary for its activation. Riddle04 and 05

Each of these 5 items of information will have to be discovered by solving a riddle.

6/Generic Operation of the Riddles

The booklet of riddles (provided with the game CD) serves as "HUB" for the game. That is to say on the basis of this booklet, the player has access to all 6 (5 basic+1 final) riddles of the game.

To attempt to solve one of them, he merely needs to show the corresponding page to NAO (a NAOmark is present on each riddle page). NAO reacts to the text of the riddle featured on the page and voices a commentary out loud to the player. As a function of the riddle, NAO can also adopt a certain pose, play a sound, etc. To summarize, NAO physically acts out the chosen riddle. It is through it or directly with it (by manipulating it) that the player will solve each riddle.

Each riddle is associated with a topic pertaining to the people of the Anamturas and to their mythology:
  Navigation (riddle01, Origin): The Anamturas were great explorers thirsty for knowledge.
  Astronomy (riddle02, Cycle): Observation of the sky and questioning as to their origins were at the heart of the Anamturas' civilization.
  Search (riddle04, Alchemy): according to their legend, the Anamturas suffered an unprecedented ecological catastrophe. From this epoch, their coexistence with Nature and the peoples encountered is complete.
  Dance (riddle03, Dance): The Anamturas commune with nature through dances and reference positions, guaranteeing optimal energy circulation around the body.
  Language (riddle05, Wisdom): The Anamturas language has evolved down the centuries. The NAOmarks are just vestiges of it.
  Ritual (Riddle06): Having become very close to the forces which govern the world, some Anamturas devised powerful ritual spells in order to travel further.

7/Lists of the Generic Key Words

Stroke NAO's head from front to back and then pronounce one of the following key words:
  Asleep: Quit the application.
  Slan Leat: Trigger the final ritual.
  Particular key words to a riddle exist in each riddle.

FIGS. 8a, 8b, 8c and 8d illustrate a game of challenge which is played with a humanoid robot in an embodiment of the invention.

This game is implemented in the functional and technical architecture described hereinabove as a comment to FIG. 4d. In this game, entitled "NAO's Challenge", the displacements of a humanoid robot 820a of the invention are remotely controlled by one of the three real players who uses a remote control for this purpose, for example an iPhone™ 810a from the company Apple™. This first player must drive the robot from a start point to a finish point. A second real player must counteract the movements of the robot by communicating displacement directives to it by way of NAOMARK 830a. A third real player seeks to help the 1st player by communicating advice to the robot and/or to the 1st player and by performing actions.

Figure 8A:
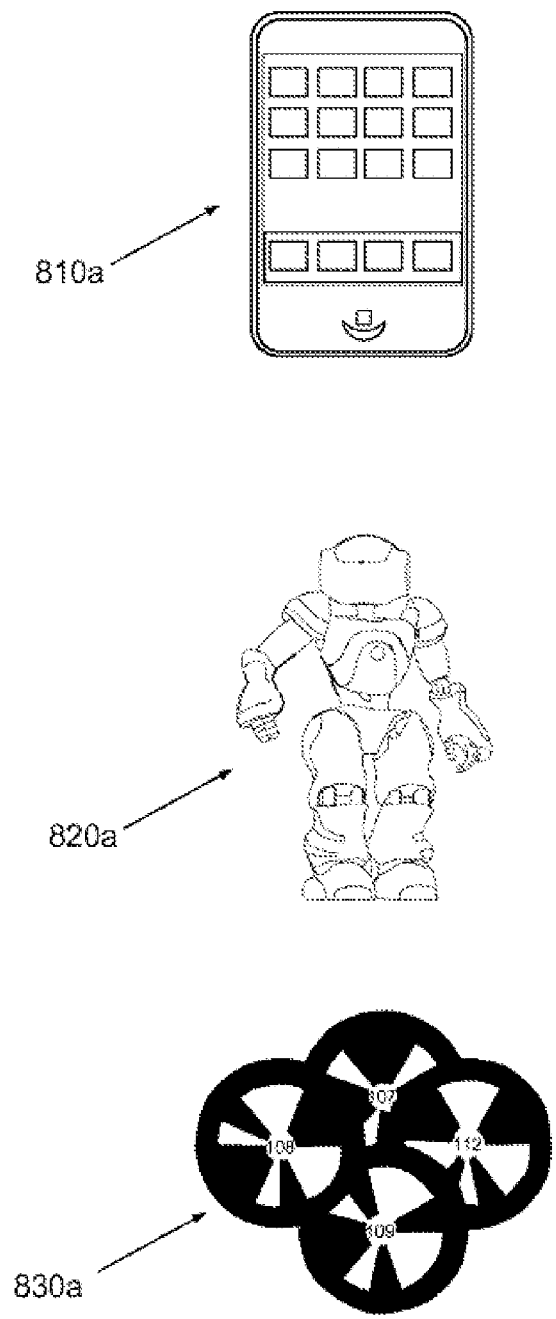
FIGS. 8a, 8b, 8c and 8d illustrate a game of challenge which is played with a humanoid robot in an embodiment of the invention.
Figure 8B:
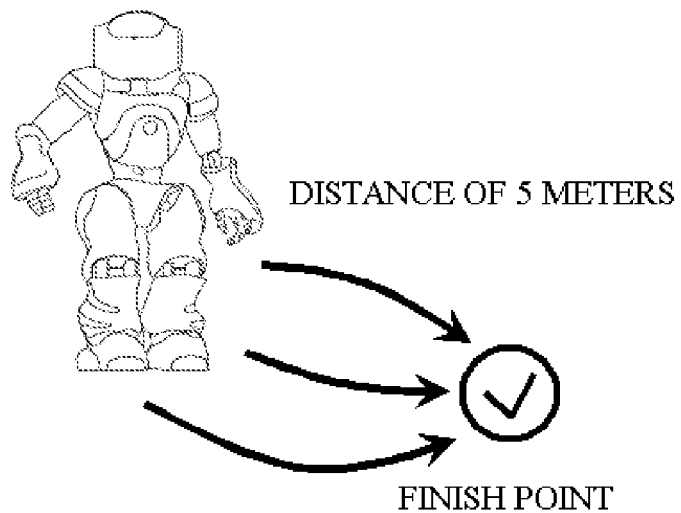

The positioning of the robot 820a, and start and finish points are illustrated in FIG. 8b.

Figure 8C:
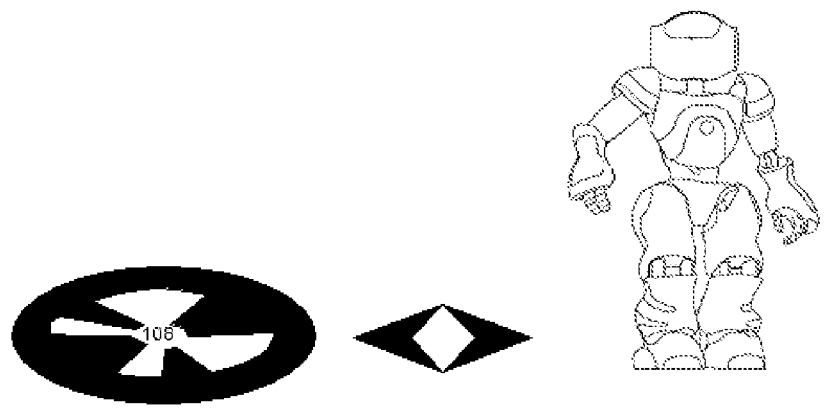

The positioning of the NAOMARK with respect to the robot 820a is illustrated in FIG. 8c.

Figure 8D:
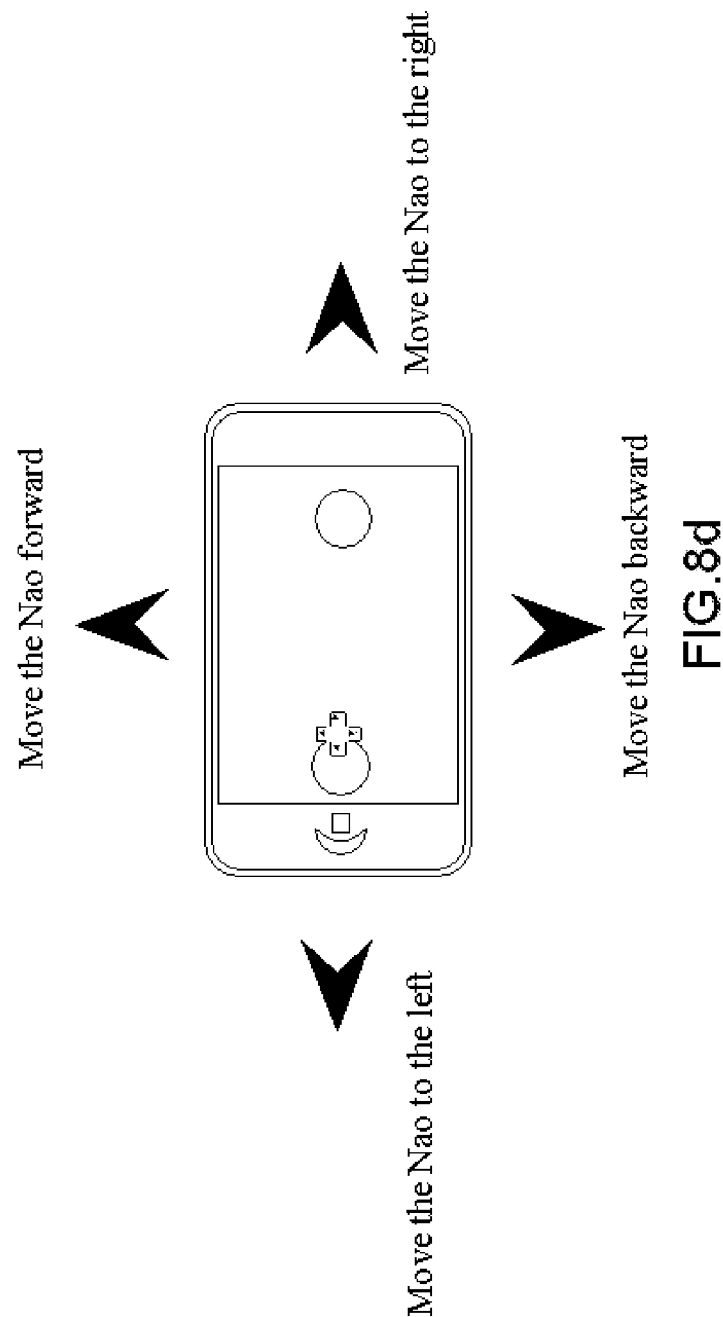

The modalities of control of the robot 820a with the help of the iPhone 810a are illustrated in FIG. 8d.

A game scenario is described hereinabove purely by way of nonlimiting illustration. Other game scenarios may be envisaged by the players without departing from the scope of the invention, the robot of the invention having significant capacity for adaptation.

1/Presentation

The challenge game is played with a single NAO robot and in versions from solo mode (a single human) to a mode with 3 humans.

A favored mode is the mode with 1 NAO and 3 Humans, this is the one that will mainly be described in the present description.

The solo mode is a training or demonstration mode. It only allows a player to test the various functionalities of the game, or to improve.

Hereinafter, the player controlling the NAO is referred to as: Player N, the player who is the Ally of player N, is referred to as: Player A and finally the Enemy and adversary of the first two players is referred to as: Player E.

2/Description of the Concept

Objective

At the start of the game, the 3 players together define a Start point (point D) and a finish point (point A). These two locations will have to be far enough apart that the NAO cannot travel the distance which separates these two points in less than a minute. Ideally, provision may be made for these two points to be in different rooms.

Player N must then take control of the NAO by virtue of his iPhone and steer it to make it start from the point D to the point A.

It has 10 minutes to travel this course.

Player E must do everything to make him fail and thus claim victory.

Player A must help player N as best he can, through his advice and the actions that he can carry out.

It is also possible to merge the roles of player N and of player A, player N then being able to manage the Ally cards himself.

The game is therefore a confrontation between the team of players N and A against player E.

Game Accessories

There are in fact three types of accessories in the game:
The iPhone: this is the control accessory, which allows player N to steer the NAO.
A series of Cards, which do or do not possess NAO-MARKs, which are the "powers" of players A and E.
Any type of accessories which may be found in a house, this will be specified subsequently.

3/Setup of the Game

At the start of the game, player N places the NAO on the start point D. He places a pack of 20 Cards in front of player A and a pack of 20 Cards in front of player E. A and E then draw 2 cards from their respective pack and keep these cards secret. (even player A with respect to player N).

On the iPhone, player N launches the game application. After a series of Logos, he arrives at the main menu.

From this menu, he chooses "multi-player game".

On the screen is displayed a counter with 10 minutes and a "Start" button.

At this moment in time, player N cannot control the NAO.

4/Launching the Game

Player N presses the "Start" button on his iPhone. An audible announcement warns all the players that the game has begun. The countdown commences. On the screen, the time is therefore perfectly visible.

From this moment in time player N can control the NAO. It can therefore move.

At key moments, the iPhone announces the situation in the game.
When it is half-time (5 minutes)
When only a minute remains.
An audible Beep sounds in the last 10 seconds.

5/Victory and Defeat.

The defeat of players N and A automatically entails the victory of player E and vice versa.

Player E cannot "win" by himself. His victory is the consequence of the defeat of players N and A.

Victory for Players N and A

If the NAO arrives at the finish point, whilst the due time has not yet elapsed, victory is achieved.

In order to validate this arrival, a NAOMARK is placed at the point A. On recognizing this NAOMARK, NAO can dispatch the news of victory to the iPhone, thereby terminating the game. A congratulatory message appears on the screen of the iPhone for players N and A.

A click on the screen returns you to the start menu.

Defeat for Players N and A

Defeat is fairly simple: if the counter reaches Zero on the iPhone, the game ends and player E is the winner.

Option: in case the NAO falls, it is possible either to declare this fall to be definitive, the NAO dispatching a defeat signal, or limit the fall to the natural loss of time that it causes, or finally ask the NAO to dispatch a message causing a loss of an amount of time (30 seconds for example), thereby handicapping players N and A.

6/The iPhone

The iPhone is the control center of the game, but also the "remote control" allowing player N to control NAO.

The main controls of NAO executed on the iPhone are the displacement controls. The accelerometer included in the iPhone charts the movements of the hands of player N and executes them as a function of a programmed code, which may be for example that illustrated by FIG. 8*d*. It is thus possible to move NAO forward, backward, to the right or to the left.

By virtue of additional buttons on the screen, it is possible to ask NAO to stretch its arms forward or to perform any other gesture that one wishes to program.

As indicated as a comment to FIG. 4*d*, it is possible to replace the iPhone with another remote control having similar functionalities.

7/The cards

Presentation

One of the notable aspects of the game is the use of cards by players A and E.

These cards allow players A and E to intervene on the progress of the game, in a manner which is positive or negative for player N.

There are 2 stacks of cards. One for player A and one for player E.

The cards are different in the 2 stacks.

The cards are divided into categories and may in certain cases be activated by NAO itself.

Use

At the start of the game, players A and E draw 2 cards each. This makes it possible in fact to have a certain strategy in the use of the cards.

Every minute, (the iPhone indicates the right moment), players A and E can draw a further card.

Players A and E can use and therefore activate the cards which are in their possession at any moment.

The activation of the card in fact depends on the type of the card.

Certain cards demand actions of certain players.

Certain cards are activated by NAO itself: by presenting the card (furnished with a NAOMARK) to NAO, The Ally Cards Here is a series of cards from which player A may benefit. The cards of player A are in general played to cancel or counter the negative effects of player E:

Cancellation Card: this card must be presented to NAO in certain cases; this card once played makes it possible to cancel a card or an effect of another card (in general a negative card of player E);

additional Time Card: this card must be presented to NAO; it makes it possible to add a minute to the remaining time;

Protection Card: this card must be presented to NAO; by invoking this card, NAO refuses to read any negative card presented to it over the course of 1 minute; on the other hand, this does not protect cards which do not require reading by NAO;

Slowdown Card: this card must be presented to NAO; by virtue of this card, time flows half as fast, thereby affording player N more time;

Finish Point Shift Card: this card does not need to be presented to NAO; this is a very particular card and there is only one such card in the game. It makes it possible to shift the Finish point with the aim of easing NAO's task; this shift is however normally limited to a radius of 3 m;

The Mystery card: this card must be presented to NAO; its effect is a surprise; in most cases it will have a positive effect and behave as a card of type 1 to 4, but in one case out of 5 it will have a negative effect: it can trigger a Dance by NAO;

Turbo Card: This card must be presented to NAO; this card allows NAO to move more quickly for 1 minute.

The Enemy Cards

Here is a series of cards from which player E may benefit. The cards of player E are in general made to impede players N and A in their quest for victory.

These are the most interesting cards since they are what give rise to the challenges with which NAO is confronted:

Motion Card: Turn around on the spot; this card is not presented to NAO; by activating this card, player E asks player N to make NAO turn around 3 times on the spot. This maneuver will therefore delay it;

Time Acceleration Card: this card must be presented to NAO; by activating this card, time begins to advance more quickly;

Dance Card: this card must be presented to NAO; by activating this card, NAO begins a demonstration dance on the spot; the latter takes a certain time and during this time, player N loses control of NAO;

Obstacle Card: this card does not need to be presented to NAO; by virtue of this card, player E can place a physical obstacle in NAO's path; NAO must then circumvent this obstacle or attempt to negotiate it, but thereby taking the risk of falling; there is no particular rule for choosing the obstacle, on the other hand, player E can in no case block access to the finish, and the obstacle must never be bigger than twice the size of NAO;

Foam Ball Card: this card does not need to be presented to NAO (except failure); this particular card asks NAO to carry out a mini-challenge; firstly, NAO must stretch out its arms; a tray is then placed on it and a foam ball is set on top; from this instant, NAO must continue to play but in this position; the difficulty stems from the fact that it must not drop the foam ball, otherwise, it suffers a penalty of 4 minutes (in this case, player E presents the card to the NAO to validate the loss of time); player A can use cards to free NAO from this constraint.

Reversed Controls Card: this card must be presented to NAO.

Once activated, the commands of the NAO by player N are reversed for 1 minute, thus becoming very difficult, especially if other events are active (foam ball, obstacle, etc.)

Finish Point Shift Card: this card does not need to be presented to NAO; this is a very particular card and there is only one such card in the game; it makes it possible to shift the Finish point, thus complicating the task of the Allies team; this shift must be carried out in a zone which is visible by the NAO.

Other cards can readily be envisaged and added to the game thus described.

8/The Solo Mode

From the main menu on the iPhone, it is possible to choose the Solo mode. In this case, the player accesses 2 sub-menus:

Free Mode: in this mode, the player will be able to control the NAO without any particular aim. This makes it possible to play with his NAO by controlling it remotely with his iPhone;

Training Mode: in this mode, the player has control of NAO and can reproduce the conditions of a real game; the time is present and he has cards A in his possession; it is the iPhone which will trigger a negative event every minute so as to delay the player; the strategy aspect is not present, but training allows self-improvement.

To implement the invention, it is necessary to ensure communication between player robot and human player or between player robots which is the least ambiguous and as fluid as possible.

The humanoid robot of the invention is advantageously equipped with sensors and software allowing it to detect and optionally recognize shapes, notably faces, and speech. However, having regard to the imperfections of mechanisms of this type, it is necessary to provide mechanisms for resolving doubt or for circumvention in the case of defective recognition.

In particular, entailing, as it does, the aptitude of the robot to recognize a player from among several, it is simple and advantageous, in numerous game configurations, to ask the players to play in their turn when their index is called (Player 1, Player 2, Player 3, etc.).

The players can also have signs making it possible to recognize them, such as NAOMARKs, described previously.

It is also possible to communicate with the robot by touching it, on parts of its body that are provided for this purpose, such as its head, its torso or its feet.

It is notably often necessary to provide means for resolving the doubts and ambiguities of the answers interpreted by the robot.

Entailing, as it does, voice recognition, a Choose Box of the Chorégraphe software, which is one of the Boxes whose generic roles and operations are explained hereinabove as a comment to FIG. 3, may be programmed to allow the robot to pose a question (optionally empty) to the user while making available for example a finite number of answers. It is also programmed to ask a player to provide details to his answer when the robot is not certain of having correctly recognized or interpreted same. This mechanism is identical to that used by a human with deficient hearing or who is immersed in an environment rendering his understanding difficult. The Choose Box is programmed with different answers according to the level of understanding of the answer by the robot. These thresholds are fixed as a function of the recognition confidence calculated by the recognition software: for example, when a first recognition threshold is not attained, the robot asks the player to repeat his answer; when the first threshold is attained but when a second, higher, recognition threshold is not attained, the robot is programmed to pose a question, the answer to which will normally make it possible to resolve the doubt.

In return, the robot communicates with the player or players through speech, or by sending signs, notably with its LEDs, or by performing gestures. It can also be programmed to communicate by coded language, such as Morse, which may be executed either in a visual manner (LED, gestures) or in an audible manner.

Having regard to its great versatility, the player robot of the invention is able to embody several characters in one and the same game. It can accordingly have several "personalities" which make it possible, expressed notably by different voices, to scale down the possibilities of the players and to increase the recreational experience.

Within the framework of the present invention, provision is also made for pause and resumption mechanisms as well as means for coping with incidents such as the robot falling over or its power supply running out.

Pauses may be programmed by the real players. The game is then saved in the various memories associated with the processors wherein the game is optionally distributed (robots, PC, remote sites). Resumption is actuated by the player according to a standard procedure or automatically by the robot which restarts in the appropriate mode.

As regards incidents, provision may be made for mechanisms for automatic saving at regular intervals, which allow a resumption when the incident is resolved.

Procedures also allow the robot to get back up into a standing position or to sit up again after a fall (Standing, Sitting Procedures).

The programming of the robot to execute the behaviors provided for in a game is performed by way of behavior editing software of the Chorégraphe™ type, described hereinabove as a comment to FIG. 3. This software comprises standard behaviors. The behaviors particular to a game may be programmed in the Python language or in C++ and be associated with the project corresponding to the game as a resource of the project. They will thus be called as needed by the various Control boxes constituting the application. The humanoid robot of the invention can however be used without requiring the behavior editing software. In this case, the behaviors and other software modules required for the execution of the game are downloaded onto the robot itself, for example by the publisher of the game. Various modes of utilization of the invention are indeed conceivable.

The examples described hereinabove are given by way of illustration of embodiments of the invention. They do not in any way limit the field of the invention, which is defined by the claims which follow.

The invention claimed is:

1. A humanoid robot, said robot configured to move on its lower limbs, perform movements of its upper limbs, send and receive messages selected from a group of visual messages, a group of speech messages, a group of gestural messages and/or a group of tactile messages, and produce at least one autonomous behavior, said at least one behavior constituting an element of a game sequence generated in response to at least one message selected from the group of visual messages, the group of speech messages, the group of gestural messages and/or the group of tactile messages, said robot being configured to ask to a player at least one question in the form of a message selected from the group of speech messages, to calculate a speech recognition confidence index of at least one response message from the player belonging to the group of speech messages, and to determine whether at least one response message belonging to the group of speech messages contains a correct response, a false response or an ambiguous response, and said determination being performed on output from a loop of iterations determined as a function of the comparison of the speech message recognition confidence index of said at least one response message with at least a first speech message recognition threshold, and a second speech message recognition threshold for said responses, said second speech message recognition threshold being higher than said first speech message recognition threshold, said robot being further configured, at each iteration:

if the confidence index is below the first threshold, to ask the player to repeat said response message;

if the confidence index is above or equal to the first threshold, and below the second threshold, to pose an additional question to the player;

if the confidence index is above or equal to the second threshold, to detect the response message as a correct response or a false response.

2. The humanoid robot of claim 1, further configured to recognize objects in its environment and of integrating them into the sequence of said game.

3. The humanoid robot of claim 1, further being the compere of a game of questions responses wherein at least one other player participates, who must provide the responses to the questions asked by the robot.

4. The humanoid robot of claim 1, further being one of the players in a game in which at least one other player participates and in which it must recognize a person or a thing as a function at least of clues which are communicated to it by said at least one other player.

5. The humanoid robot of claim 1, wherein its movements are determined as a function of at least a combination of first displacement directives which are communicated to it by a remote control manipulated by a first player, second displacement directives, antagonistic to the first directives, which are communicated to it visually by a second player, and third displacement directives, antagonistic to the second directives and which are communicated to it by a third player.

6. The humanoid robot of claim 1, wherein at least two robots participate in one and the same game, said at least two robots being in communication through at least one visual, speech and/or gestural message.

7. The humanoid robot of claim 1, wherein at least two robots participate in one and the same game, said at least two robots being in communication by exchange of behavior messages.

8. The humanoid robot as claimed in claim 7, wherein said exchange of behavior messages is activated after a step of reciprocal identification of said robots by exchange of information characterizing them.

9. The humanoid robot of claim 8, wherein said at least two robots are furthermore able to download a signal for synchronizing their movements.

10. The humanoid robot of claim 1, wherein at least one player robot and another player are situated in two places not linked by a local network.

11. The humanoid robot of claim 10, wherein said at least one player robot and another player communicate by wide area network communication protocol and in that said player robot is endowed with autonomous processing means for the encoding of network accesses.

12. The humanoid robot of claim 1, wherein a player is able to communicate with it by way of a visual code.

13. The humanoid robot of claim 1, further being configured to carry out a function of assistance of at least one other player consisting in performing at least one action in the game in place of the player.

14. The humanoid robot of claim 1, further being configured to trigger and manage the interruptions and resumptions of a game sequence.

15. The humanoid robot of claim 1, further being configured to recognize at least one player from among several, said recognition using a clue selected from a group of visual, speech, gestural and/or tactile clues.

16. A method of controlling a humanoid robot configured to move on its lower limbs, perform movements of its upper limbs, send and receive messages selected from a group of visual messages, a group of speech messages, a group of gestural messages and/or a group of tactile messages, and produce at least one autonomous behavior, said at least one behavior constituting an element of a game sequence generated in response to at least one message selected from the group of visual messages, the group of speech messages, the group of gestural messages and/or the group of tactile messages, said method comprising steps of:
asking at least one question in the form of a message selected from the group of speech messages,
calculating a speech message recognition confidence index of at least one response message belonging to the group of speech messages, and
determining whether at least one response message belonging to the group of speech messages contains a correct response, a false response or an ambiguous response, said determining being performed on output from a loop of iterations determined as a function of the comparison of the speech message recognition confidence index of said at least one response message with at least a first speech message recognition threshold, and a second speech message recognition threshold for said responses, said second speech message recognition threshold being higher than said first speech message recognition threshold, said method further comprising, at each iteration:
if the confidence index is below the first threshold, to ask the player to repeat said response message;
if the confidence index is above or equal to the first threshold, and below the second threshold, to pose an additional question to the player;
if the confidence index is above or equal to the second threshold, to detect the response message as a correct response or a false response.

17. A computer program comprising program code instructions executed on a computer to control a humanoid robot,
said program being configured to allow the humanoid robot to move on its lower limbs, to perform movements of its upper limbs, to send and to receive messages selected from a group of visual messages, a group of speech messages, a group of gestural messages and/or a group of tactile messages, and to produce at least one autonomous behavior, said at least one behavior constituting an element of a game sequence generated in response to at least one message selected from the group of visual messages, the group of speech messages, the group of gestural messages and/or the group of tactile messages,
said program further comprising computer code instructions configured to generate a behavior in which said robot asks at least one question in the form of a message selected from the group of speech messages, to calculate a speech message recognition confidence index of at least one response message belonging to the group of speech messages, and computer code instructions configured to determine whether at least one response message belonging to the group of speech messages contains a correct response, a false response or an ambiguous response, said determination being performed on output from a loop of iterations determined as a function of the comparison of the speech message recognition confidence index of said at least one response message with a first speech message recognition threshold and a second speech message recognition threshold for said responses, said second speech message recognition threshold being higher than said first speech message recognition threshold, said program further comprising computer code instructions configured, at each iteration:
if the confidence index is below the first threshold, to ask the player to repeat said response message;
if the confidence index is above or equal to the first threshold, and below the second threshold, to pose an additional question to the player;
if the confidence index is above or equal to the second threshold, to detect the response message as a correct response or a false response.

18. The humanoid robot of claim 1, wherein a player in a game in which it is able to cooperate with at least one other player to solve at least one riddle.

19. The humanoid robot of claim 1, wherein said determination further includes asking a player to repeat an answer.

20. The humanoid robot of claim 1, wherein said determination further includes asking an additional question.

* * * * *